US008221122B2

(12) United States Patent
Neely

(10) Patent No.: US 8,221,122 B2
(45) Date of Patent: Jul. 17, 2012

(54) SYSTEM AND METHOD FOR AIRCRAFT MISSION MODELING

(75) Inventor: Thomas Neely, Haddonfield, NJ (US)

(73) Assignee: Analytical Graphics, Inc., Exton, PA (US)

( * ) Notice: Subject to any disclaimer, the term of this patent is extended or adjusted under 35 U.S.C. 154(b) by 1440 days.

(21) Appl. No.: 11/740,456

(22) Filed: Apr. 26, 2007

(65) Prior Publication Data

US 2009/0326893 A1 Dec. 31, 2009

Related U.S. Application Data

(60) Provisional application No. 60/795,148, filed on Apr. 26, 2006.

(51) Int. Cl.
*G09B 9/08* (2006.01)

(52) U.S. Cl. .......................................... 434/30; 701/400

(58) Field of Classification Search .............. 434/28–71; 701/2–11, 14–15, 23–26, 120–123, 200–208, 701/213, 400–408, 134; 244/75.1, 76, 137, 244/182–190; 705/7, 40, 14.66; 703/8; 342/26, 342/29, 33, 65, 118; 702/5; 340/29, 33, 340/95, 933–964, 970–974; 73/1.78
See application file for complete search history.

(56) References Cited

U.S. PATENT DOCUMENTS

| | | | | |
|---|---|---|---|---|
| 6,199,008 | B1 * | 3/2001 | Aratow et al. | 701/120 |
| 6,405,124 | B1 * | 6/2002 | Hutton | 701/200 |
| 6,710,723 | B2 * | 3/2004 | Muller et al. | 340/970 |
| 7,020,046 | B1 * | 3/2006 | Baylog et al. | 367/124 |
| 7,228,227 | B2 * | 6/2007 | Speer | 701/206 |
| 2006/0031006 | A1 * | 2/2006 | Stenbock et al. | 701/200 |
| 2006/0109267 | A1 * | 5/2006 | Rybacki et al. | 345/423 |

OTHER PUBLICATIONS

Dubins.PDF—“Planning Algorithms”, Lavalle, Steven M., Cambridge University Press, 2006. p. 698.*

Dubins2.PDF—“Path tracking control for Dubins Cars”—Abstract—Balluchi, A; Bicchi, A; Balestrino, A;Casalino G;—‘Robotics and Automation’, 1996,vol. 4.*

Zyskowski, Michael K. “Aircraft Simulation Techniques Used in Low-Cost, Commercial Software.” AIAA Modeling and Simulation Technologies Conference and Exhibit, Aug. 11-14, 2003, Austin Texas (Copyright 2003, Michael K. Zyskowski and Microsoft Corporation).

* cited by examiner

*Primary Examiner* — Xuan Thai
*Assistant Examiner* — Timothy A Musselman
(74) *Attorney, Agent, or Firm* — The Marbury Law Group, PLLC

(57) ABSTRACT

An expert system and method for aircraft mission modeling using a matrix application, a preferred embodiment of which is incorporated into Mission Modeler software used in conjunction with Satellite Toolkit (STK) software. More generally, the invention is an expert system that draws on an extensive set of basic building blocks that represent standard aircraft maneuvers and concepts, and assembles those building blocks into complex and realistic sequences that represent aircraft motion with very high fidelity. One benefit of this invention is that it provides a simple system and method for users with no piloting experience to generate highly realistic flight paths.

16 Claims, 35 Drawing Sheets

SYSTEM AND METHOD FOR AIRCRAFT MISSION MODELING

RELATED APPLICATIONS

This application claims the benefit of U.S. Provisional Application Ser. No. 60/795,148, filed Apr. 26, 2006, which is hereby incorporated by reference in its entirety for all purposes.

BACKGROUND OF THE INVENTION

Embodiments in this application relate to an expert system and method for aircraft mission modeling using a matrix application. In a preferred embodiment, the invention is incorporated into Mission Modeler software used in conjunction with Satellite Toolkit (STK®) software available from Analytical Graphics Inc. of Malvern, Pa. More generally, embodiments of the invention relate to an expert system that draws on an extensive set of basic building blocks that represent standard aircraft maneuvers and concepts, and assembles those building blocks into complex and realistic sequences that represent aircraft motion with very high fidelity. One benefit of the embodiments disclosed herein is that they provide a simple system and method for users with no piloting experience to generate highly realistic flight paths.

Prior art solutions employed by mission planning software (various military flight planning systems such as the Portable Flight Planning Software—PFPS and the Joint Mission Planning System—JMPS, as well as commercial planning software such as FliteStar® from Jeppesen Sanderson, Inc.) use a data abstraction that is significantly more specific than employed by the invention. In particular, concepts that are easily modeled in the present invention, such as aerial refueling, formation flight, and takeoff and landing from moving aircraft carriers, require significant advances beyond prior art applications. One reason for this is that prior art solutions are dependent on fixed geographic points as a reference for calculations. Furthermore, the prior art solutions have a hard-coded user interface that is designed around their data abstraction. To change the user interface requires changing the data abstraction and vice versa. Since the present invention has a much simpler underlying data abstraction, its user interface only needs to know the general relationships and protocols, and can therefore adapt to objects which the inventor had no prior knowledge of.

Other prior art solutions used for the preparation of flight plans lack the ability to animate the aircraft's flight path with any degree of realism. These packages usually represent the flight path as a coarse sequence of straight line segments and are therefore mathematically incapable of computing a realistic, smooth attitude which, by the physics of aircraft flight, will always be curved.

BRIEF SUMMARY OF THE INVENTION

Embodiments comprise an abstraction of the motion of an aircraft into two parts: (1) a Profile—defined herein as the motion in a 2D downrange-altitude, and (2) a mapping of that Profile to 3D. The objects that perform the mapping to 3D are termed Procedures. Procedures work with Aircraft Performance Models to generate the 2D Profiles.

Procedures therefore provide the navigation functionality and orchestrate the generation of Profiles, the actual implementation of which is completely separate from Procedures and is handled by Aircraft Performance Models. Preferred embodiments of the design are flexible and allow for Procedures to create Profiles based on parameters supplied by performance models, if this is appropriate. The Terrain Following and VTOL (vertical takeoff and landing) Performance Models do not generate Profiles but instead provide parameters which are used by specialized Terrain Following and VTOL Procedures to generate the appropriate Profile. In a commercial embodiment of the invention used in STK 7, these Procedure types can not be created (and will be hidden from the user) unless the user has attached the Terrain Following and/or VTOL Performance Models to their aircraft. This ability to create new Procedure types that require specialized performance capabilities of an aircraft without requiring changes to the application user interface is an important capability of certain embodiments of the invention.

Procedures in turn refer to Sites to use as their location or reference point. Examples of Sites are waypoints and runways. More esoteric Sites include aircraft carriers (for Carrier Takeoffs and Landing Procedures) or other aircraft (for Formation Flight Procedures) or aerial tankers (For Refueling Procedures), although these are not meant as limitations.

Procedures and their Sites are further grouped into Mission Phases and a complete mission contains one or more phases. An Aircraft Models object is associated with each mission. The Aircraft Models object is a collection of different Performance Models of various types and may have multiple instances of a given type. For example, a fighter jet will typically have various ways in which it takes off: sometime the flaps are down and the afterburner is employed, sometimes not. Each configuration has significantly different performance characteristics in terms of the takeoff roll and speed at liftoff. By allowing for multiple individual Performance Models, the invention can easily reuse Performance Models that are potentially complex and time-consuming to specify.

Performance Models typically generate Profiles, although that is not specifically required and is not meant to be a limitation. Acceleration, Takeoff, Landing, Climb, Cruise, Descent, Terrain Following and VTOL Performance Model types are used to generate Profiles. Each one of these Profiles is potentially complex and time consuming to create, but once created, the Profile may be reused at appropriate points in the flight. A Procedure concerned with flying from one position and altitude to another position and altitude would employ the individual Performance Models and stitch the individual Profiles together into a more sophisticated sequence that embodies the actions of an expert pilot who draws on personal experience to perform standard maneuvers to accomplish some desired trajectory.

The Mission Phase exists to let a user specify the particular instance of a given type of Performance Model to employ for the Procedures that are part of that phase of flight. For example, a typical fighter training mission involves takeoff and flight to some station where the aircraft holds while other aircraft involved in the mission get into position. This all happens at maximum endurance or maximum range flight conditions. Under such conditions, the pilots wish to have the maximum fuel available for what will happen when all aircraft are in position, which in the training mission would involve simulated combat during which afterburners are used and the aircraft is maneuvered extremely aggressively, etc. When this combat phase of flight is over, the pilots revert to maximum range/endurance flight to return to base. This example would be modeled in the invention by three phases of flight.

The overall concepts are captured in a COM Object Model which may be extended by users of the software. In a matrix application, such as STK in a preferred embodiment, the graphical user interface (GUI) captures the relationships between Procedures, Sites and Aircraft Performance Models and allows users to plug in new versions of each that "just work".

Embodiments allow entirely new types of Performance Models to be created and utilized. This allows a user who is creating a new Procedure to also create some aircraft capability which the Procedure depends on. Likewise, the user may create a new site type which the Procedure needs to operate. All of these objects may be stored in a Catalog and may be easily reused.

Each Site and Procedure type makes use of Factory Objects in addition to methods on the Procedure and aircraft object interfaces to enforce logic which determines allowable/sensible combinations of objects to be presented to the user when constructing a mission. This system of Factory Objects and simple methods on the aircraft and Procedure interfaces comprises a Valid Site/Procedure Protocol that is applicable to building any potential mission by any potential type of aircraft. For example: a Takeoff Procedure needs a runway from which to take off. When the user selects a site type other than a runway, the Takeoff Procedure will NOT be shown to the user as a valid choice. A more complex example is that of a helicopter that transitions to hover, then performs maneuvers in the hover, then transitions to forward flight. It would make no sense to present a takeoff Procedure to the user at the point where the helicopter has just transitioned to hover; the invention will only present the option of hovering Procedures in this situation and then will only allow the specification of other hovering Procedures or a transition to a forward flight Procedure following a hover.

The design enables users to change how aircraft perform without affecting the ways they navigate, or vice versa, or do both, and does not require any changes to the GUI of the matrix application to accommodate these new objects. The design is more generic than prior art solutions and actually allows for prior art abstractions to be incorporated into the "plug and play" framework.

The aircraft may be animated as it flies along its trajectory, and the aircraft comprises smooth and realistic roll and pitch maneuvers.

Embodiments require no piloting skills of any sort to construct a flight path that has extremely realistic motion. Rather, in one embodiment, the present invention is an expert system in that it breaks down the required 3D motion of the aircraft into small segments, each of which embody the techniques by which an experienced pilot would maneuver the aircraft. These individual dynamic state segments implement an interface which allows them to be coupled into sequences to perform more arbitrary and potentially highly complex maneuvers and to do so in the way that an expert pilot would fly them. These dynamic state segments are employed within the Procedure objects. The individual segment objects are exposed in the COM model for users to employ when creating their own Procedures.

There is no limit to the number of segment types and an extensibility mechanism exists for adding new types. Individual basic aerobatic or fighter maneuvers are modeled by new dynamic state segments. Each of these segments implements some standard definition of the maneuver. The higher logic thinking employed by a fighter pilot, the decisions on which type of maneuver to use and when, would be embodied in an air combat Procedure or aerobatic Procedure. By breaking the problem up into these high level and low level objects, it becomes easy to massively reuse objects and obtain significant productivity gains when developing new types of Procedures.

As stated above, the prior art solutions employed by mission planning software use a data abstraction that is more specific than employed by the invention such that concepts that are easily modeled in the invention are difficult or impossible to achieve with the prior art. The reason for this is that prior art solutions are dependent on fixed geographic points as their counterpart to Site objects. In the present invention, the Site object is literally anything and only a given Procedure type needs to understand what it is. The prior art uses a hard-coded user interface that is designed around their data abstraction so that changing the user interface requires changing the data abstraction and vice versa. Since the present invention has a much simpler underlying data abstraction, its user interface only needs to know the general relationship between Sites and Procedures (the fact that Procedures refer to Sites) and enforce the valid Site/Procedure protocol, and can therefore adapt to objects which the inventor had no prior knowledge of.

DETAILED DESCRIPTION OF THE INVENTION

Figure 1:
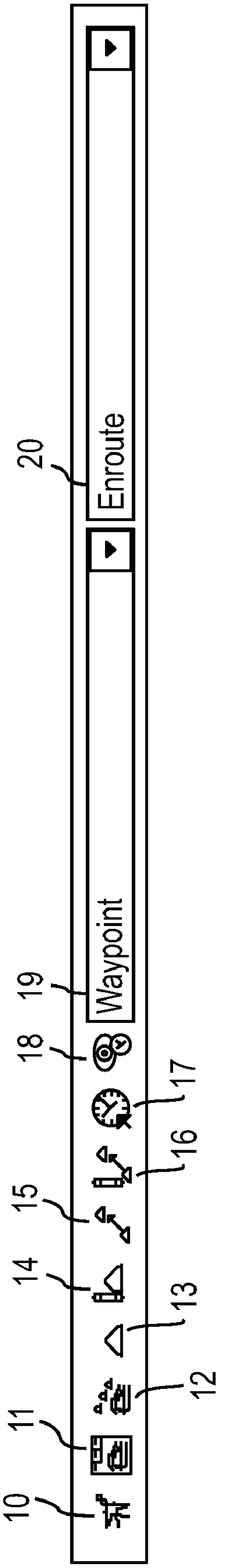
FIG. 1 illustrates a toolbar.

Embodiments are drawn to aircraft mission modeling based upon the abstraction of the motion of the aircraft into two parts: (1) a Profile defining the motion in a 2D downrange-altitude, and (2) a mapping of that Profile to 3D. Procedures are the objects that perform the mapping to 3D. Procedures work with Aircraft Performance Models to generate the 2D Profiles. As such, Procedures provide the navigation functionality and orchestrate the generation of Profiles, the actual implementation of which is completely separate from Procedures and is handled by Aircraft Performance Models.

Procedures use Sites as their location or reference point, e.g., waypoints, runways, aircraft carriers, other aircraft in formation, or refueling tankers. Procedures and their Sites are grouped into Mission Phases and a complete mission contains one or more phases. An Aircraft Models object is associated with each mission. The Aircraft Models object is a collection of different Performance Models of various types and may have multiple instances of a given type, i.e., a fighter jet will typically have various ways in which it takes off: sometime the flaps are down and the afterburner is employed, sometimes not. Each configuration has significantly different performance characteristics in terms of the takeoff roll and speed at liftoff. By allowing for multiple individual Performance Models, the invention can easily reuse Performance Models that are potentially complex and time-consuming to specify.

Advanced concepts incorporated in various embodiments comprise use of a Flat-Earth Coordinate System, the use of Parameterized Profile Curves, the use of a Point-to-Point Navigator algorithm, and the use of Terrain Following.

Flat-Earth Coordinate System

As noted above, embodiments use Procedures to generate 3D motion for an aircraft. Although not required by the Procedure interface, current Mission Modeler Procedures are preferably conceptualized in terms of a flat earth coordinate system. For example, a racetrack holding Procedure is two semicircles connected with straight line segments.

An algorithm creates a flat earth coordinate system between any two points on the earth, and converts coordinates in the flat earth system to the correct Earth-Centered Fixed (ECF) coordinates. Straight lines in the flat earth system convert to great arcs in ECF.

Handling arbitrary concepts like holding patterns or arbitrary sequences of turns while imposing constraints on the aircraft's turn performance becomes extremely difficult when working directly in ECF coordinates, as done in prior art solutions. The Flat Earth Coordinate System overcomes these problems by "unrolling the earth surface" between any two points. In a preferred embodiment, the basis vectors for the unrolling operation are maintained as members of a C++ class (but other languages and constructs can be used) and may be used to do the reverse transformation from flat earth coordinates back to ECF.

Parameterized Profile Curves

The invention uses a family of curves parameterized by flight path parameters to efficiently and realistically represent motion of an aircraft in the downrange-altitude coordinate system. The state of an aircraft at any instant in time may be rapidly computed without storing large amounts of time-tagged data.

Many flight maneuvers make extremely heavy demands on the downrange-altitude Profile of an aircraft, particularly terrain following and arbitrary climbs and descents. Resorting to high resolution time stepped data and/or the engineering parameters used to generate the time stepped data is one possible technical solution to the need. Little is lost however in down-sampling the high resolution data and curve fitting. This is precisely what the Mission Modeler Performance Models do. They use expert knowledge of various types of vertical plane maneuvers such as climbs, descents, takeoff, landing and cruising flight to generate highly accurate representations of maneuvers that a traditional flight simulator would require orders of magnitude more data to represent.

Traditional flight simulators (e.g., Microsoft Flight Simulator) use a starting state of an aircraft in conjunction with force models using engineering parameters to apply numerical integration in time and generate the trajectory. In order to calculate the state of an aircraft at any time, there must be some previous time from which to start the integration as well as the parameters which comprise the force models. Parameters are rarely if ever constant, vary with speed and altitude and are typically non-linear in nature, so that it requires a substantial effort to keep track of them as the aircraft speed and altitude changes. To compute arbitrary states without re-integrating from the initial state requires the storage of a large amount of intermediate state and parameter data. The engineering parameters used in the force models are quantities like lift and drag coefficients and various stability coefficients. These values will not be well understood by many (most) users and, in general, prevent users from creating realistic representations of arbitrary aircraft.

In various embodiments, Performance Models employ performance data in conjunction with expert system models for an aircraft to generate a Profile, which is a sequence of individual Profile Segments, to model realistic climbs, descents, takeoff and landing. The aircraft performance data used by the expert system models are commonly understood quantities such as airspeed, the airspeed type (i.e., Mach number, Equivalent, Calibrated, and True airspeeds in certain embodiments of the present invention), vertical speed, takeoff ground roll, etc. The Profile segments are extensible and support an interface that allows them to be sequenced together and interpolated with high speed and accuracy. Each Profile segment of the current implementation can assume one of four different curve shapes: linear, semi-circular, Bezier and a special shape that is numerically integrated between two points while maintaining a linearly interpolated airspeed (when working with Mach, Equivalent and Calibrated airspeeds which are functions of air density, these lines are not straight). The actual choice of the curve type to use is decided upon by the Performance Model. The Profile Segment interface enables the segment to be clipped (truncated in time or down range), shifted (in time, downrange and fuel consumed) and have the initial state (speed) of the segment updated. This allows one Profile to be clipped and/or joined (appended or prepended) to another Profile to form more complex profiles.

The use of these Parameterized Profile Curves results in a dramatic reduction in the data that must be stored and simplifies the computation of the state at an arbitrary time. The curves also result in continuously smooth motion that closely corresponds to what a simulation would provide.

The use of performance data (which is often easily obtained from a variety of sources including the Internet) as opposed to engineering data makes it feasible for users to define models of known as well as completely arbitrary or new aircraft.

Point-to-Point Navigator

The Point-to-Point Navigator is an algorithm that will generate an optimum sequence of turns to fly an aircraft from one position and heading to another position and heading, while satisfying constraints on the aircraft's turn performance. This object does what an expert pilot would do when faced with the same problem.

The Point-to-Point Navigator operates in a Flat Earth Coordinate System specified in terms of the start and end positions for the flight path segment. The algorithm uses the turn capability of the aircraft to determine the turn radius for the aircraft and then builds four circles tangent to the start and end velocity vectors in the flat earth system. The algorithm will choose one of the two possible start circles and one of the two possible end circles connected with a line segment tangent to each such that the total heading change for the combination of turns is minimized.

The position and velocity of the aircraft as a function of time or downrange position may be analytically computed on the resulting path in the Flat Earth Coordinate system, which may then be used to easily convert to ECF. The nature of the Flat Earth System will cause the straight line segment connecting the two circles to convert to a great arc curve in ECF coordinates.

Terrain Following

Terrain Following analytically models the trajectory an actual aircraft would follow during a terrain-following flight.

Traditional prior art implementations interpolate the terrain at some specified granularity and then use the resulting positions and altitudes to construct a flight path. Using such interpolation allows an aircraft to impact cliffs either head on or by shearing off a wing. When the sampling interval is very small (in order to partially mitigate the cliff problem) the resulting flight path is so ragged as to be totally unrepresentative of an actual aircraft.

The present invention samples the terrain data at the native terrain resolution, then at each point selects the highest altitude of the 4 altitudes at the corners of the box around the sample point. The resulting potentially very high resolution data is then windowed to reduce its resolution while maintaining the maximum altitude over the window. This not only significantly reduces memory consumption but results in a trajectory segment that will be no smaller than the window, thus enhancing the realism and smoothness of the trajectory. The windowed terrain data is then input into an algorithm that uses a maximum pitch angle to further de-sample the terrain data, so that the aircraft will not exceed that pitch angle on climbs/descents to clear peaks and valleys. By varying the pitch angle, the "hardness/softness of the ride" may be controlled—directly analogous to real aircraft terrain following control systems. Finally, the resulting raw data is further processed to build Parameterized Profile Curve trajectory segments mathematically guaranteed not to intersect the terrain.

Human pilots have a distinct aversion to flying with large pitch angles close to the ground. In addition, they visually smooth or integrate the terrain ahead of them to remove the high frequency components of the terrain. This thought process can be directly modeled via a time window, as is done with this algorithm. The terrain following Performance Model allows for the specification of the speed at which to fly along with the maximum pitch angle and time window to apply. Increasing the window and decreasing the pitch angle will remove more of the high frequency components of the terrain Profile and make "the ride" smoother and softer while a short window and higher pitch angles will do the opposite. These same parameters are also valid to model an automatic control system. It is therefore possible to use these parameters to tune the Mission Modeler terrain following algorithm to individual pilots or aircraft control systems.

In a preferred embodiment, the Aircraft Mission Modeler is an enhanced method of creating aircraft missions using STK software on a workstation, personal computer or laptop. A user accesses the Aircraft Mission Modeler by creating an aircraft object, and then selecting the Mission Modeler "propagator" within the STK software. With the Aircraft Mission Modeler, the aircraft's route is modeled by a sequence of curves parameterized by well known performance characteristics of aircraft, including cruise airspeed, climb rate, roll rate, and bank angle. The precise state of an aircraft at any given time can be computed analytically—swiftly and without excessive data storage needs. A Mission Modeler aircraft is defined by the type of aircraft and by the mission it performs.

This structure allows a user to utilize an aircraft for much more than simple point-to-point travel. A user can select from a number of pre-defined and user-defined aircraft types. Each aircraft type is capable of being customized by changing the basic parameter settings of the aircraft, the 3D model used to represent the aircraft, and by adding, changing, and removing performance models.

The mission is a sequence of procedures that utilize aircraft performance models and sites to define the vehicle's route and flight characteristics. The mission can be organized into phases, which are logical constructs that allow a user to vary the performance models being used—to suit different elements of the mission.

EXAMPLES

Following are some example for use of the embodiments described herein.

Defining a Mission in the 3D Graphics Window

A user can define a Mission Modeler Aircraft mission directly in the 3D Graphics window by utilizing the 3D Object Editing and 3D Aircraft Mission Modeler Editing toolbars.

The 3D Aircraft Mission Modeler Editing Toolbar is illustrated in FIG. 1 and comprises the following controls, which allow a user to define a Mission using 3D object editing. A Select Aircraft button 10 is used to select the aircraft to be used for the Mission. An Aircraft Catalog for Current Aircraft button 11 allows a user to select basic parameters and Performance Models for the aircraft. A Specify Phase Performance Models button 12 allows a user to select Performance Models for the aircraft to be applied only to the current Mission Phase. A Modify Site button 13 allows a user to edit the site properties of the procedure currently selected in the 3D Graphics window. A Change Site Type button 14 allows a user to change the site type and define the new site's properties for the procedure currently selected in the 3D Graphics window. A Modify Procedure button 15 allows a user to edit the procedure properties of the procedure currently selected in the 3D Graphics window. A Change Procedure Type button 16 allows a user to change the procedure type and define the new procedure's properties for the procedure currently selected in the 3D Graphics window. A Set Time button 17 allows a user to set the time at which the procedure occurs. A Zoom Animation button 18 allows a user to click to set the animation time to the stop time of the currently selected control point; this allows a user to jump quickly from point to point in the mission. A user sets the 3D Graphics window view to be from and to the aircraft in order for this button to function properly. A MissionModeler Site Menu 19 allows a user to select the site type for inserted procedures. A MissionModeler Procedure Menu 20 allows a user to select the type for inserted procedures.

Setting Up

Figure 2:
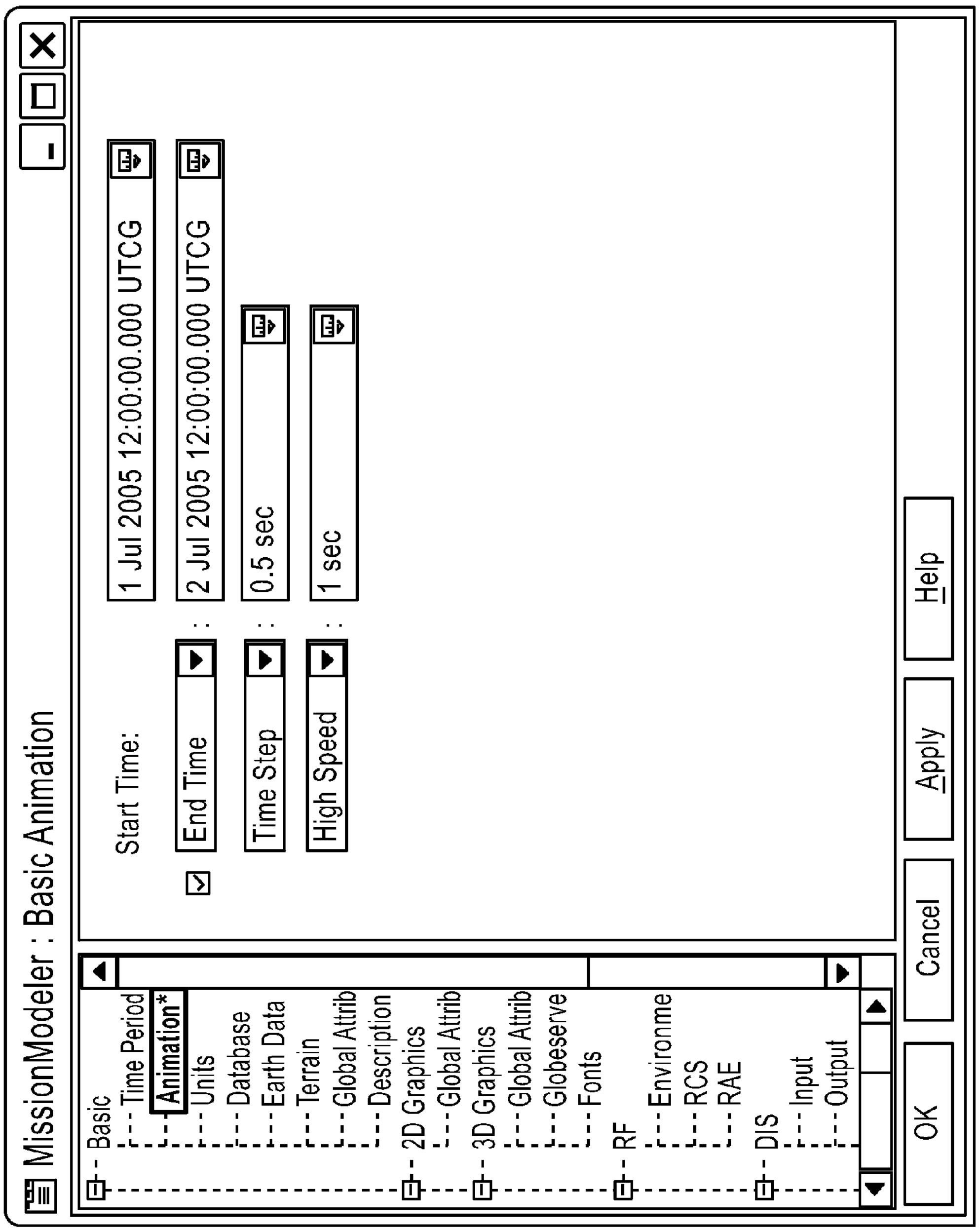
FIG. 2 illustrates a basic animation window.

A user creates a scenario in STK, renames it "MissionModeler", and opens the scenario's properties browser. From the properties browser, the user selects Animation under the Basic heading from the panel on the left side of the window as illustrated in FIG. 2 to display the Basic-Animation page. On the Basic-Animation page, the user sets the Time Step to 0.5 seconds and selects End Time (in this example the user accepts the default end time). By selecting Units under the Basic heading, the user reaches the Basic-Units properties page and then sets the distance unit to feet.

Figure 3:
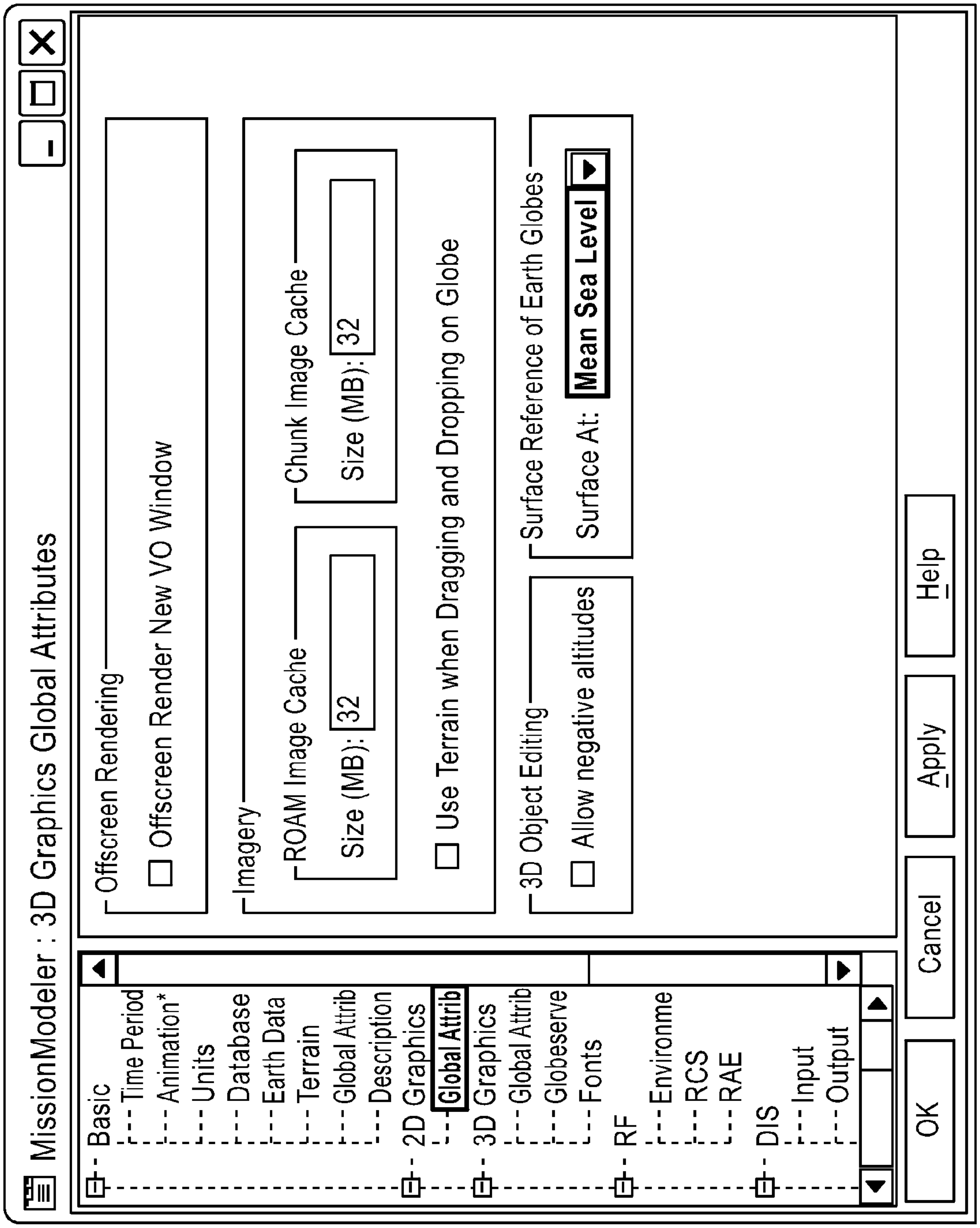
FIG. 3 illustrates a 3D graphics global attributes window.

An exemplary set up of the Aircraft Mission Modeler is to set the surface reference of the globe to Mean Sea Level. The user, in general, sets this reference each time a scenario is created to use with the Aircraft Mission Modeler. The surface reference can be changed on the 3D Graphics—Global Attributes page, illustrated in FIG. 3. In the Surface At field, under Surface Reference of Earth Globes, the user selects Mean Sea Level from the drop-down menu and then clicks OK.

Figure 4:
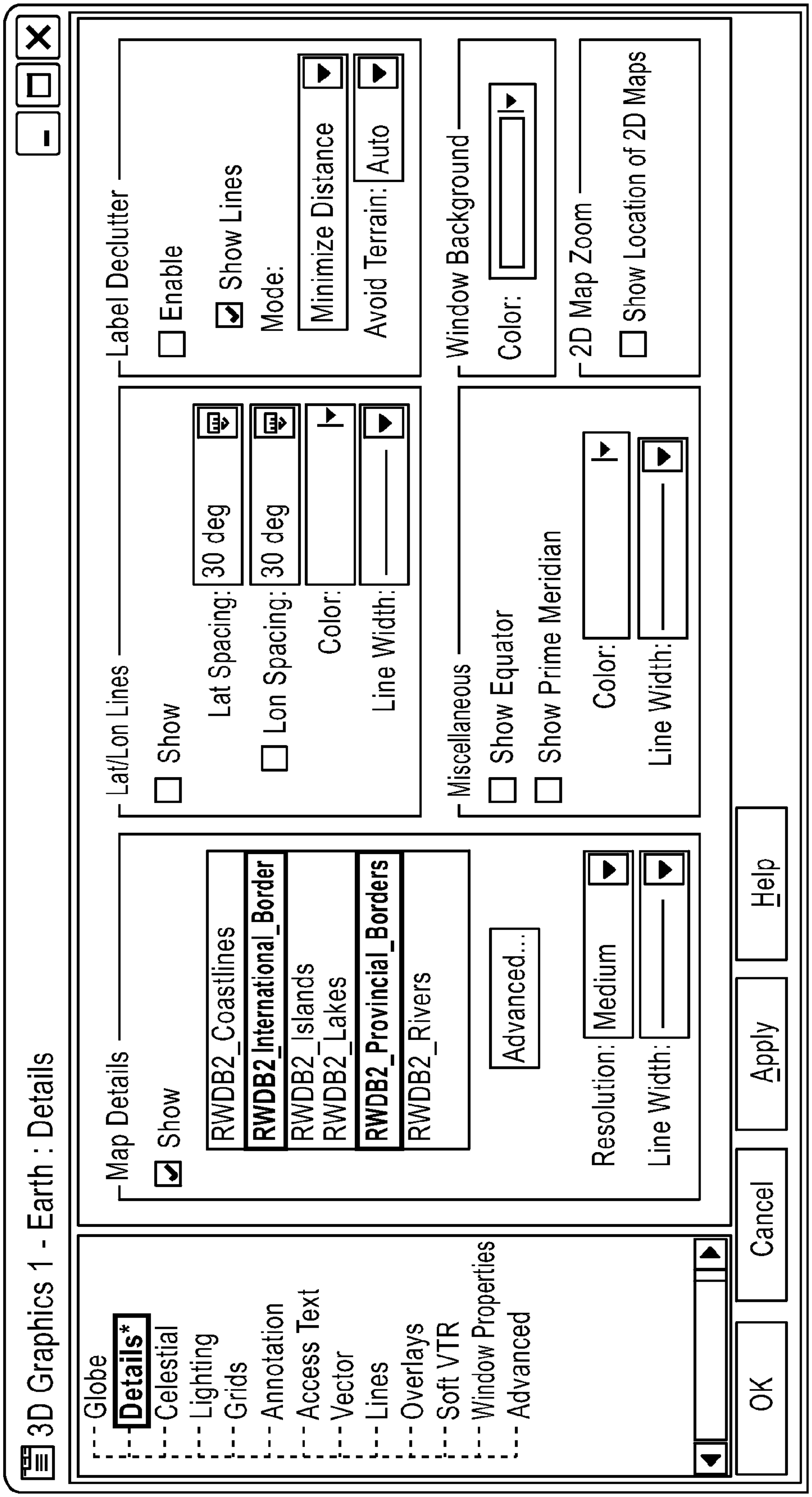
FIG. 4 illustrates a details windows.
Figure 5:
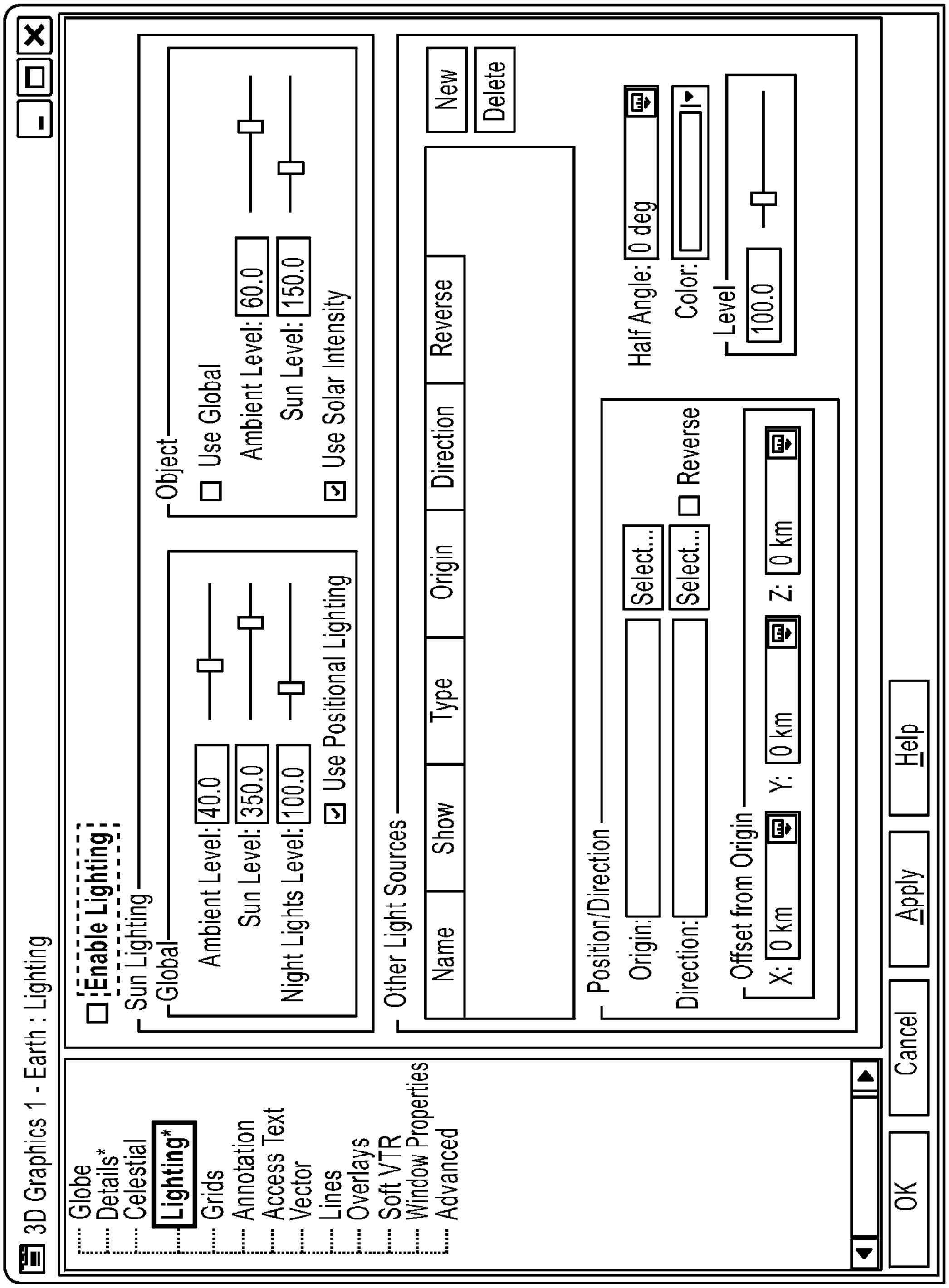
FIG. 5 illustrates a lighting window.

The user then opens the Properties Browser for the 3D Graphics window, and on the Details page illustrated in FIG. 4, selects the display of International and Provincial Borders, and turns off the display of other map details. The user then selects the Lighting page, illustrated in FIG. 5, and clears the Enable Lighting checkbox. This will cause the entire globe to be displayed with full daylight conditions at all times, which for purposes of this example will make observing all of the exercises easier. The user than clicks OK when finished.

Figure 6:
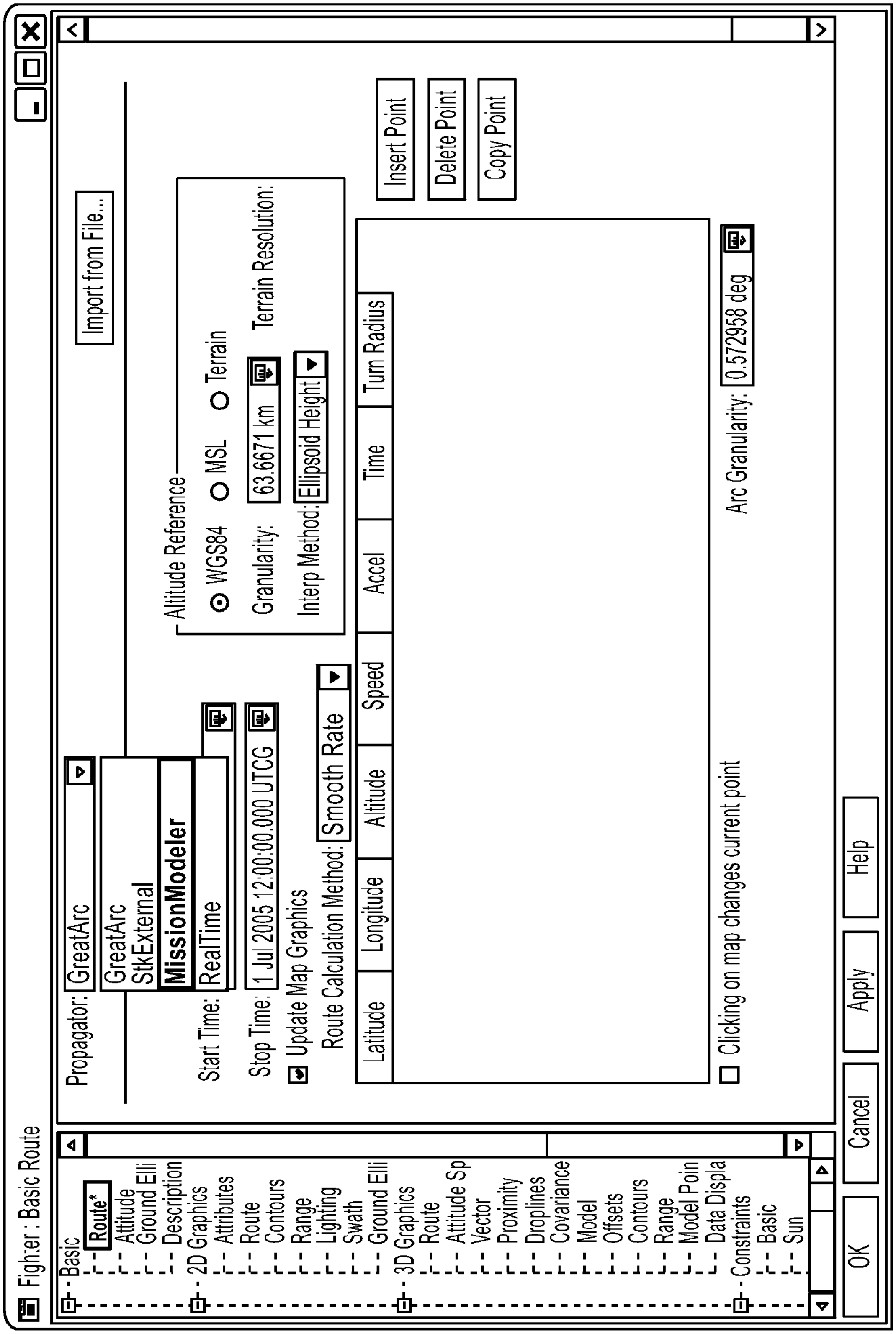
FIG. 6 illustrates basic route window.

Within STK, the user inserts an Aircraft object and renames it "Fighter". The object does not immediately appear in the 2D or 3D Graphics windows because the user must first define its Mission. The user then opens the properties browser for the "Fighter" aircraft. On the Basic-Route page illustrated in FIG. 6, the user clicks the Propagator drop-down menu, selects Mission Modeler, and clicks OK to accept the change and continue.

The user then right clicks in the toolbar area of STK and selects the 3D Object Editing toolbar (if it is not already displayed), which will then appear in the toolbar area. The user right clicks again and selects the 3D Aircraft Mission Modeler Editing toolbar. At this point, the user can adjust the layout of the toolbars to whatever arrangement they prefer. The toolbars will initially appear grayed out, and with blank fields, but FIG. 1 depicts the toolbars as they appear when active.

Selecting an Aircraft

Figure 7:
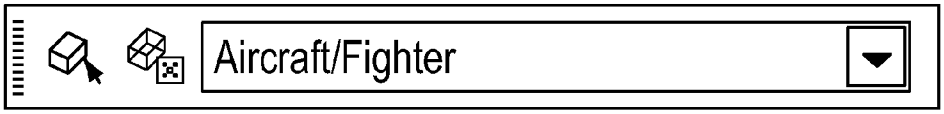
FIG. 7 illustrates a drop-down menu in the 3D Object Editing toolbar
Figure 8:
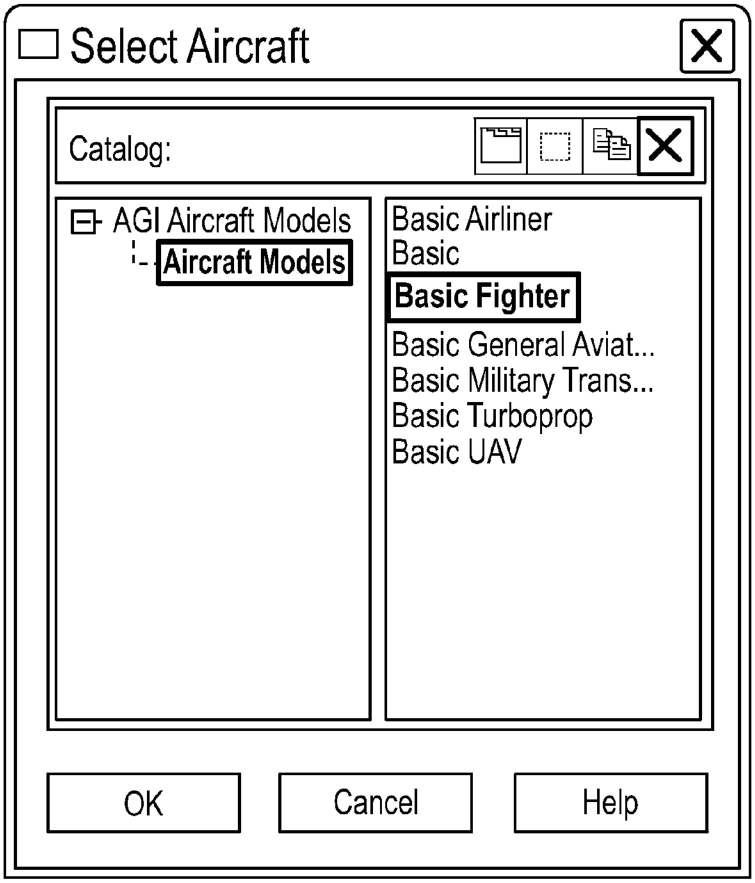
FIG. 8 illustrates an aircraft selection window.

Before adding Phases and Procedures, a user must select an aircraft for the mission. A Mission Modeler aircraft's properties are defined in terms of performance models and a 3D model that will represent the aircraft in the 3D Graphics window. To do this, the user first selects the 3D Graphics window and then clicks the drop-down menu in the 3D Object Editing toolbar and select the "Fighter" Aircraft object, as illustrated in FIG. 7. The user then clicks the Object Edit Start/Accept button on the 3D Object Editing toolbar. The 3D Aircraft Mission Modeler Editing toolbar will become active. In the 3D Aircraft Mission Modeler Editing toolbar, the user clicks the Select Aircraft button to open the Select Aircraft window, illustrated in FIG. 8. In the Select Aircraft window, the user selects Basic Fighter. From this window, a user can create new aircraft and edit the properties of any aircraft listed, including its associated 3D model and its Performance Models. For this example, the user just clicks OK to set the aircraft to a fighter and closes the window.

Adding Procedures

Procedures are building blocks that comprise the aircraft's route. Each procedure is associated with a site. The site defines the location and the nature of the position at which the procedure takes place—either a runway or a waypoint, and also determines what procedure types are available for selection. The Procedure itself defines the maneuver that the aircraft will perform.

Figure 9:
FIG. 9 illustrates a drop-down site menu.
Figure 10:
FIG. 10 illustrates a drop-down procedure menu.
Figure 11:
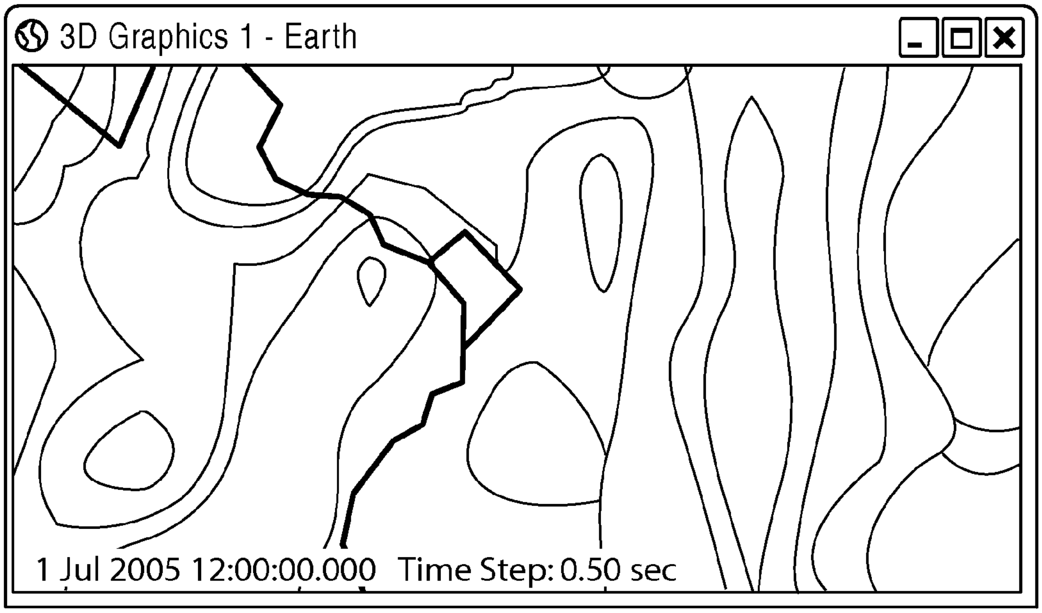
FIG. 11 illustrates a map window.
Figure 12:
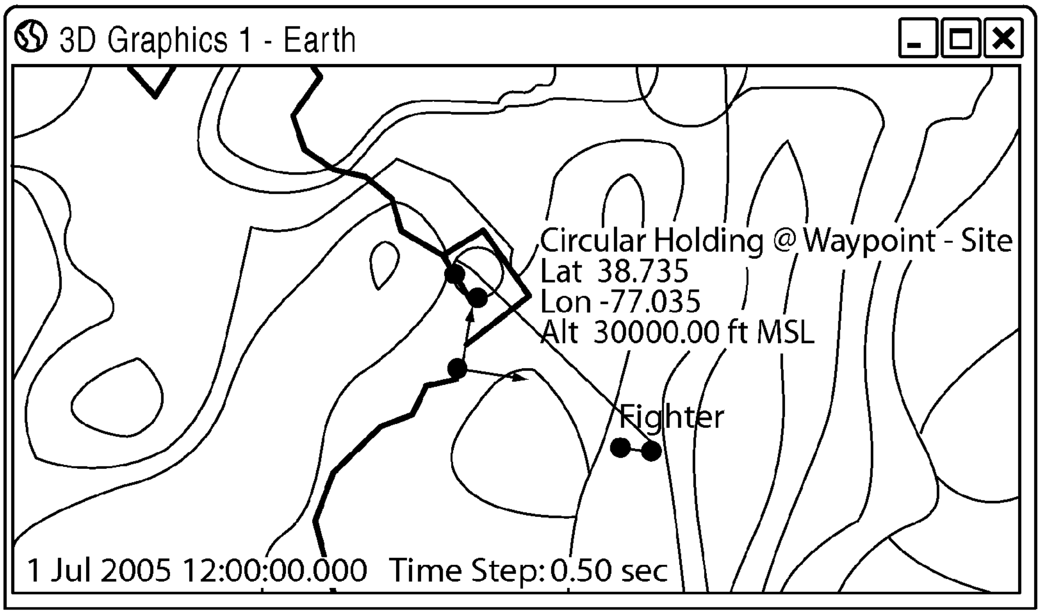
FIG. 12 illustrates a map window with mission modeling information.

The user accepts the default value of Runway in the MissionModeler Site menu, illustrated in FIG. 9, and then clicks the MissionModeler Procedure menu to select Takeoff, illustrated in FIG. 10. In the 3D Graphics window, the user zooms in on Washington D.C. and the surrounding area, illustrated in FIG. 11. While holding down the Shift key, the user left-clicks somewhere to the southeast of Washington D.C., close to the water's edge (that vertical blue stripe). This will insert the Takeoff procedure selected. Then, using the MissionModeler Site and Procedure menus as done above, the user selects a Waypoint site and a Circular Holding procedure. By shift+left-clicking in the 3D Graphics window slightly south of Washington D.C., the user inserts the procedure. The circle portion of the procedure will appear over the city, as illustrated in FIG. 12.

If the circle isn't well positioned over the city, the user can left-click on the control points, which appear as red dots on the circle, and then move them to manipulate the circle's position. A selected control point will display latitude, longitude, and altitude arrows, in green, red, and blue respectively. The user can click on an arrow to modify that element of the control point's position, and then click and drag the control point to make the desired change. It is possible to manipulate latitude and longitude at once by clicking on each of those arrows and then click and dragging on the control point. The final control point of a procedure also displays a larger, light blue arrow, which defines the heading of the aircraft at the end of the procedure. For the purposes of this exercise, the user should not manipulate the heading.

Figure 13:
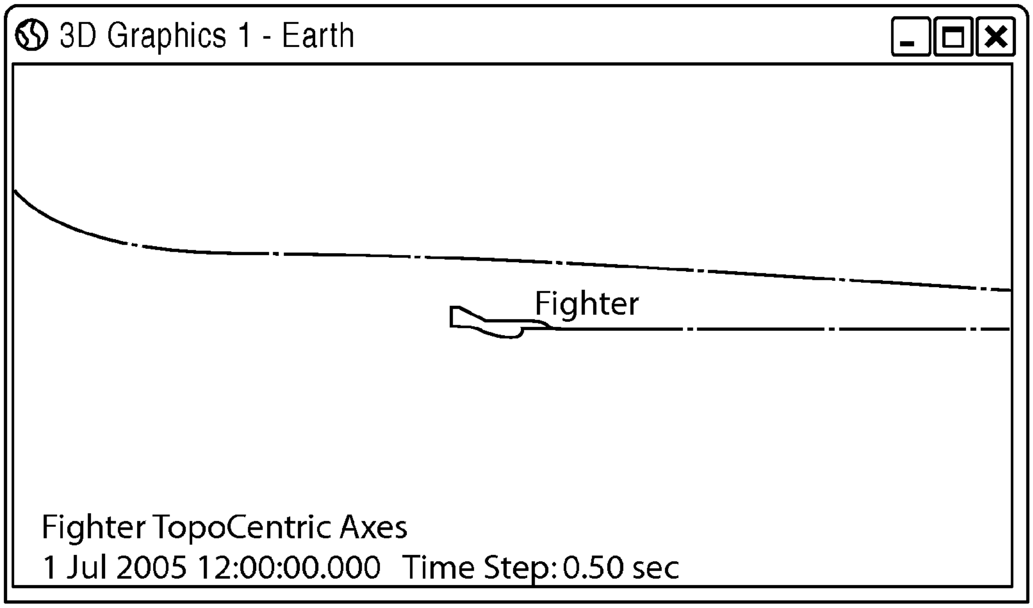
FIG. 13 illustrates a mission view window.
Figure 14:
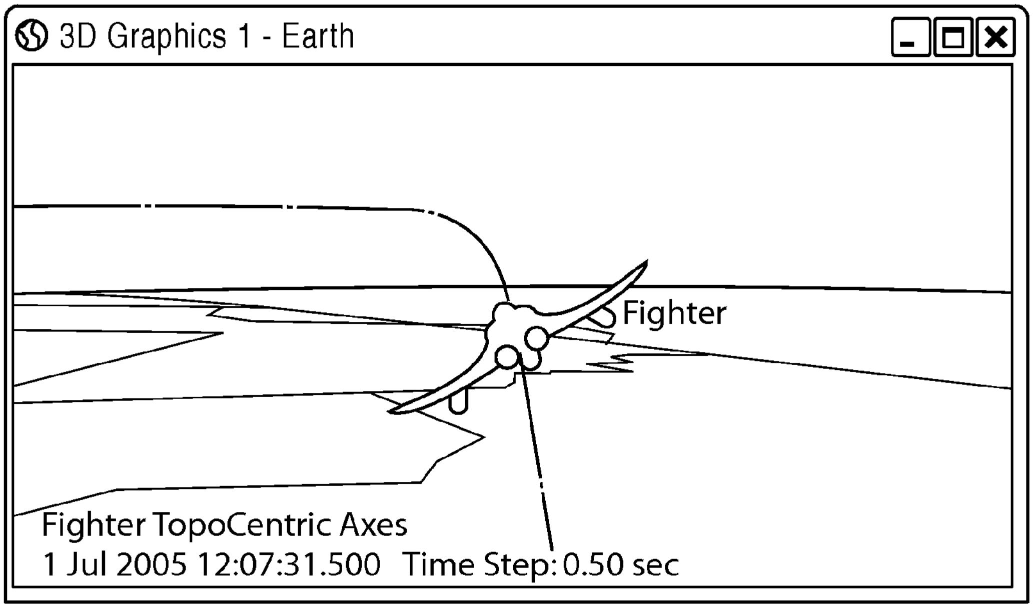
FIG. 14 illustrates a mission animation window.

Using the MissionModeler Site and Procedure menus, the user selects a Runway site and a Landing procedure. The user shift+left-clicks in the 3D Graphics window near to the position of the first Runway site to insert the procedure and then clicks the Object Edit Start/Accept button. The user then selects the View From/To button on the 3D Graphics toolbar and sets the view from and to the "Fighter". Clicking OK returns the user to the 3D Graphics window. The user can then select the Reset button on the Animation toolbar, and then click the Play button to display the animation illustrated in FIG. 13. The user can then zoom in upon and around the Fighter as it travels the mission route, and observe its movements.

Defining a Mission in the Properties Browser

A Mission is defined on the Mission page comprises the Mission toolbar, the phases and procedures list, and the Mission Profile. The Mission toolbar provides buttons for adding, modifying, and deleting phases and procedures, as well as defining aircraft properties. The phases and procedures list displays all of the phases and procedures defined for the aircraft. The Mission Profile can display charts of a variety of information, but by default it shows the altitude and the downrange distance of the aircraft over the course of the mission.

Setting Up

To set up for a new project, the user just creates a new aircraft object and renames it "Transport".

Selecting an Aircraft

Figure 15:
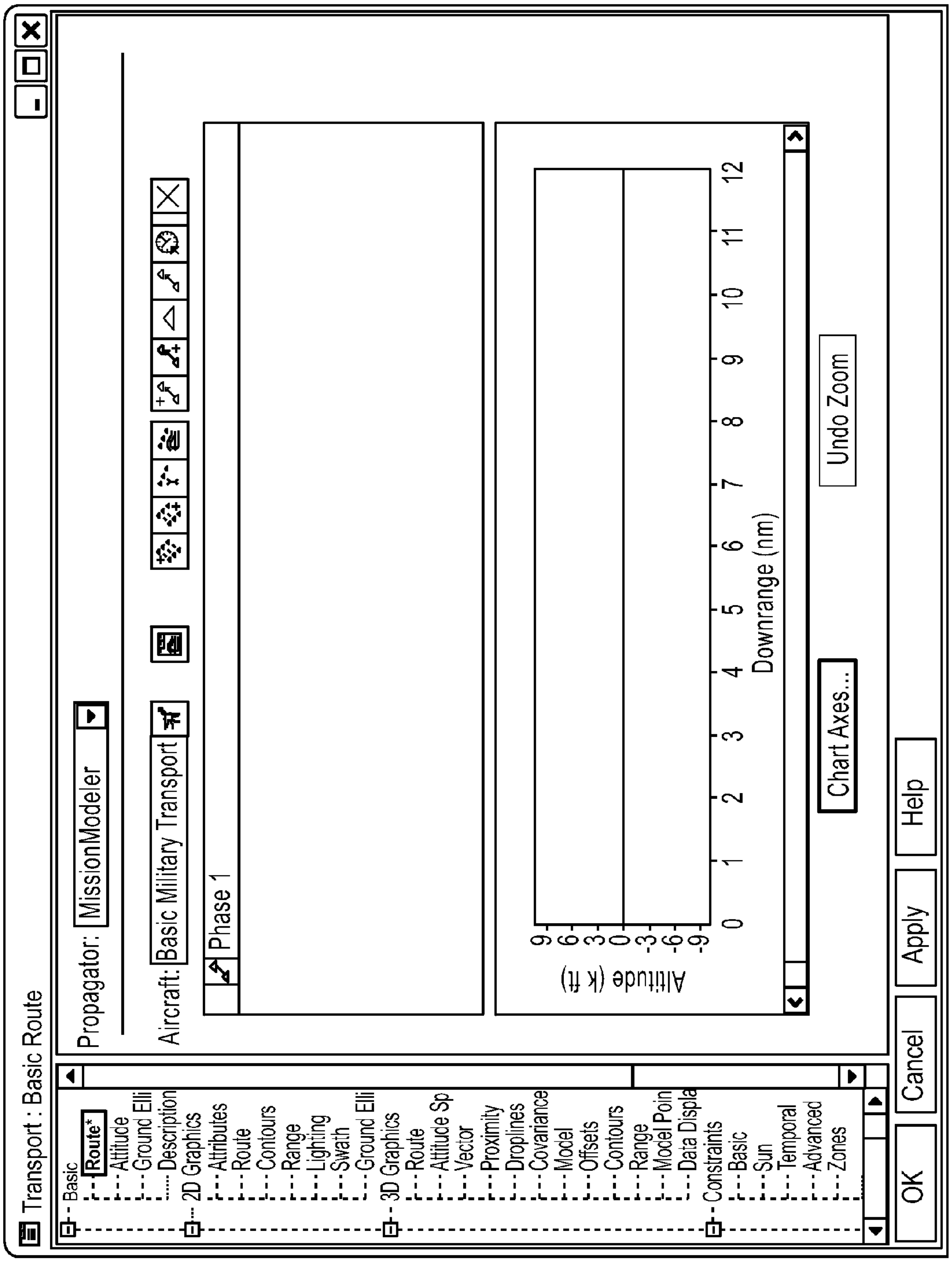
FIG. 15 illustrates a route window.

To select an aircraft, the user opens the Transport's properties browser and selects the Aircraft Mission Modeler as the propagator. On the Route page, illustrated in FIG. 15, the user clicks the Select Aircraft button and in the Select Aircraft window, selects Basic Military Transport, and then clicks OK to close the window.

Adding Procedures

Figure 16:
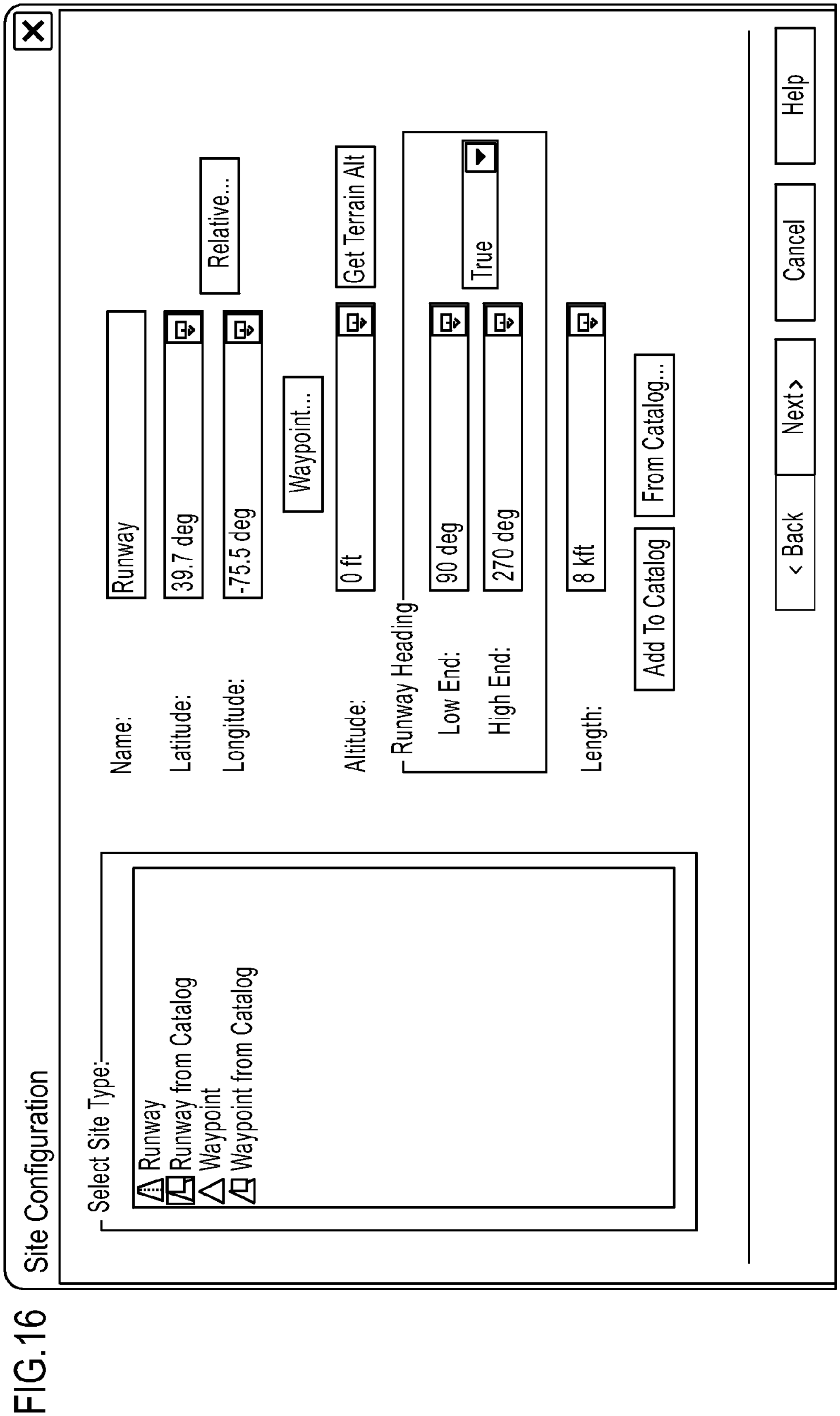
FIG. 16 illustrates a site configuration window.

The user will defines a mission for the Transport Aircraft using the Mission page of the Transport's properties browser. The user first clicks the Insert Procedure After Phase button on the Mission toolbar, which will open the Site Configuration window, illustrated in FIG. 16. The Site Configuration window is used to define the site to be associated with the procedure a user is adding. This step is functionally the same as selecting a site from the MissionModeler Site menu while using 3D Object editing as done in the first exercise, only there are a number of options a user can configure in this window that are unavailable on the toolbar.

Figure 17:
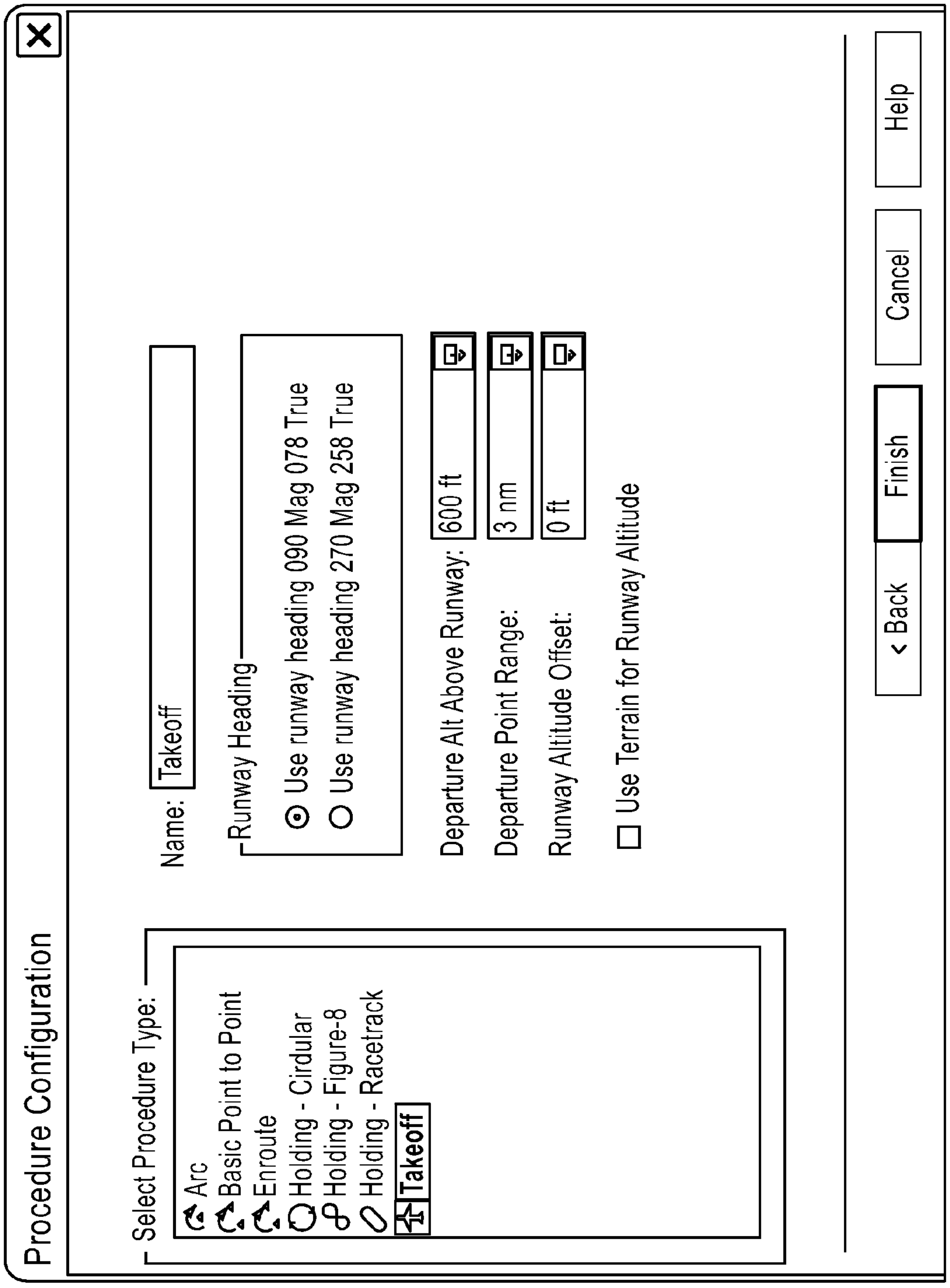
FIG. 17 illustrates a procedure configuration window.

In the Select Site Type area, the user clicks on Runway to select a Runway site that the user will define. In the Latitude and Longitude fields, the user enters 39.7 deg and −75.5 deg, respectively, and then clicks "Next." The Procedure Configuration page illustrated in FIG. 17 is used to define the type of procedure to be performed. In the Select Procedure Type area, the user clicks on Takeoff. Like the Site Configuration page, this step is functionally the same as selecting a site from the MissionModeler Procedure menu while using 3D Object editing, only with more options—one of which the user will configure in this instance. In the Departure Alt Above field, the user enters 600 ft. and clicks Finish.

On the Mission page, the Takeoff procedure appears in the list of Phases and Procedures. The user right-clicks the Takeoff procedure, and selects "Insert new procedure after" from the drop-down menu. This menu selection has the same function as the Insert Procedure After Procedure button on the Mission toolbar. In the Site Configuration window, the user selects Waypoint as the type, enters 39.9 deg and −75.5 deg for latitude and longitude, respectively, and then clicks Next.

Figure 18:
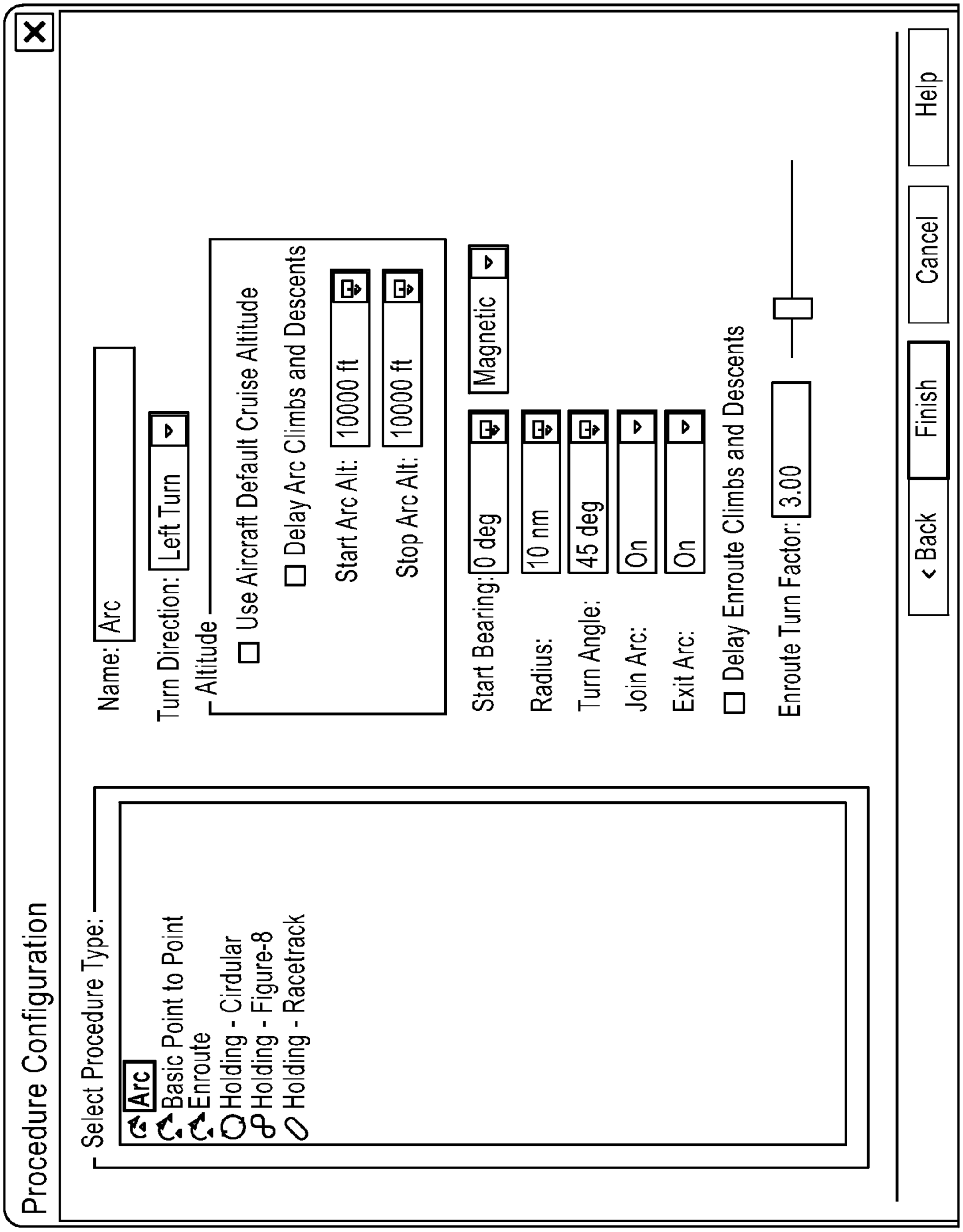
FIG. 18 illustrates another procedure configuration window.

In the Procedure Configuration window, illustrated in FIG. 18, the user selects Arc as the type, clears the Use Aircraft Default Cruise Altitude checkbox and sets the Start Arc Alt and Stop Arc Alt fields to 10,000 ft. The Enroute Turn Factor will increase turn radii while flying to the start of the Arc. The user can use the slider to increase the turn radius, but for this exercise the user clicks in the box that displays the value and manually enters a Turn Factor of 3. This will ease the aircraft's turn while performing this procedure. The user then clicks Finish to add the Arc procedure to the mission and proceeds to insert another procedure after the Arc procedure.

Figure 19:
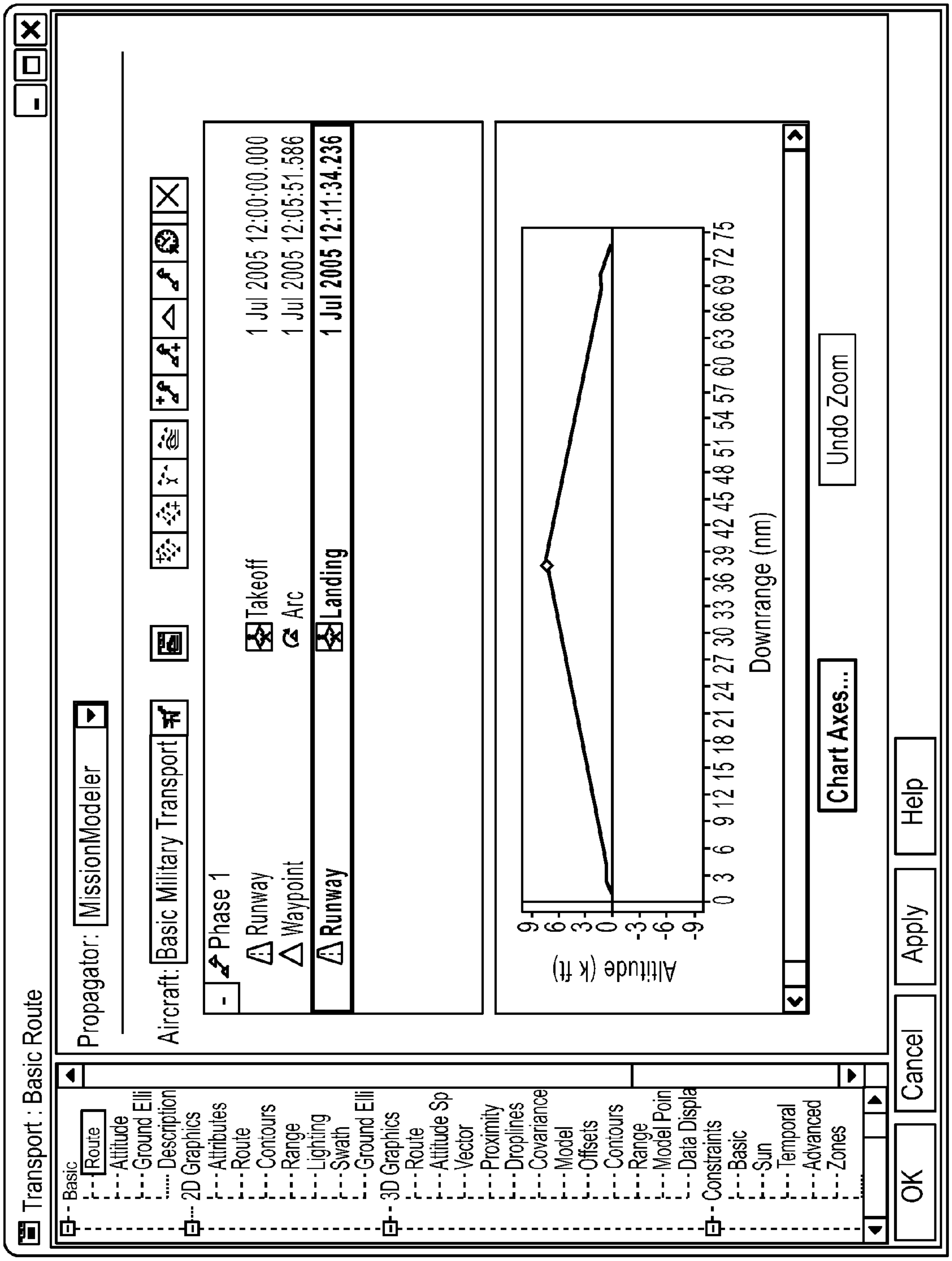
FIG. 19 illustrates a basic route window.

In the Site Configuration window, the user selects Runway as the type. In the Latitude and Longitude fields, the user enters 40 deg and −75.4 deg, respectively, and then clicks Next. In the Procedure Configuration window, the user selects Landing and then clicks Finish. The Mission page now displays all three of the mission procedures and the mission profile shows the aircraft's altitude over the downrange distance, as illustrated in FIG. 19.

Figure 20:
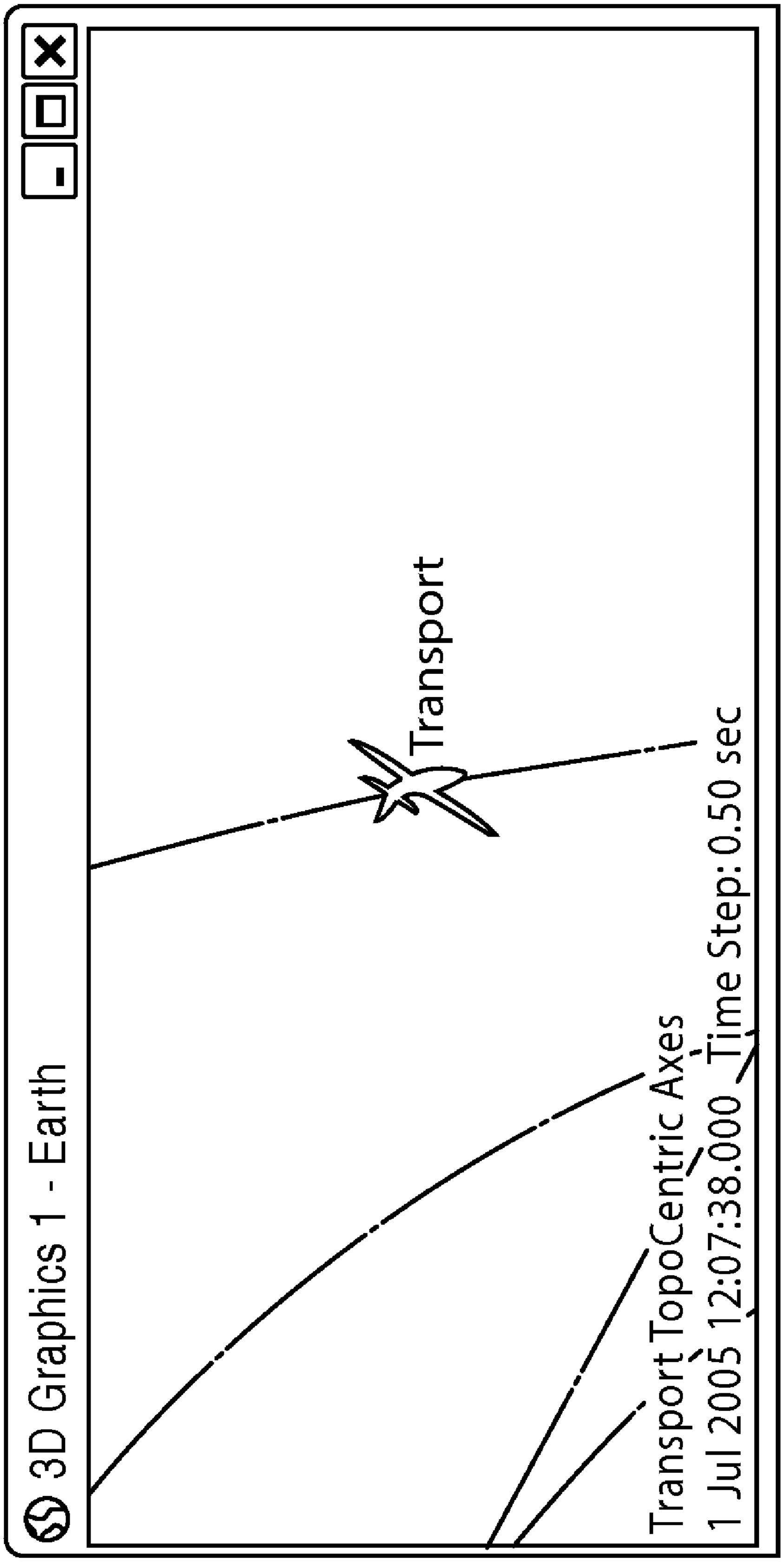
FIG. 20 illustrates an animation window.

The user then clicks OK on the Mission page and selects the 3D Graphics window. Next, the user selects the View From/To button on the 3D Graphics toolbar and sets the view from and to the Transport, and then clicks Reset on the Animation toolbar. As with the previous exercise, the user clicks the Play button and observes the aircraft's flight, as illustrated in FIG. 20.

Using Catalogs

The Aircraft Mission Modeler, in a preferred embodiment, utilizes a catalog structure for the loading and saving of aircraft, runways, and waypoints. Each of these elements of a mission definition has an associated catalog in STK. A user can add, modify, and delete items from the catalogs to make it easier to use the same elements for multiple aircraft and procedures. In addition, a user can import catalogs of compatible data, such as DAFIF data, and access them for use in defining these elements. Capabilities of various embodiments allow a user to create a new aircraft type and a new waypoint and then access the waypoint from the catalog to define the site of a procedure.

Figure 21:
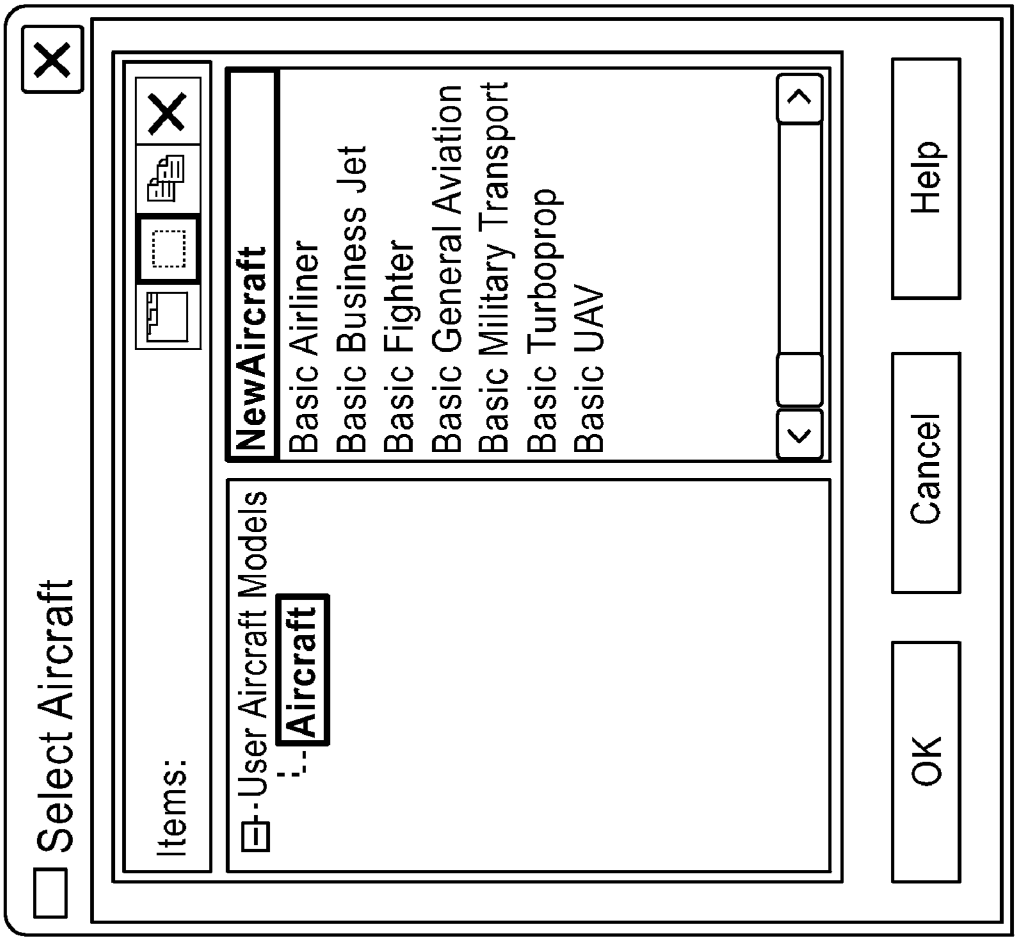
FIG. 21 illustrates an aircraft selection window.
Figure 22:
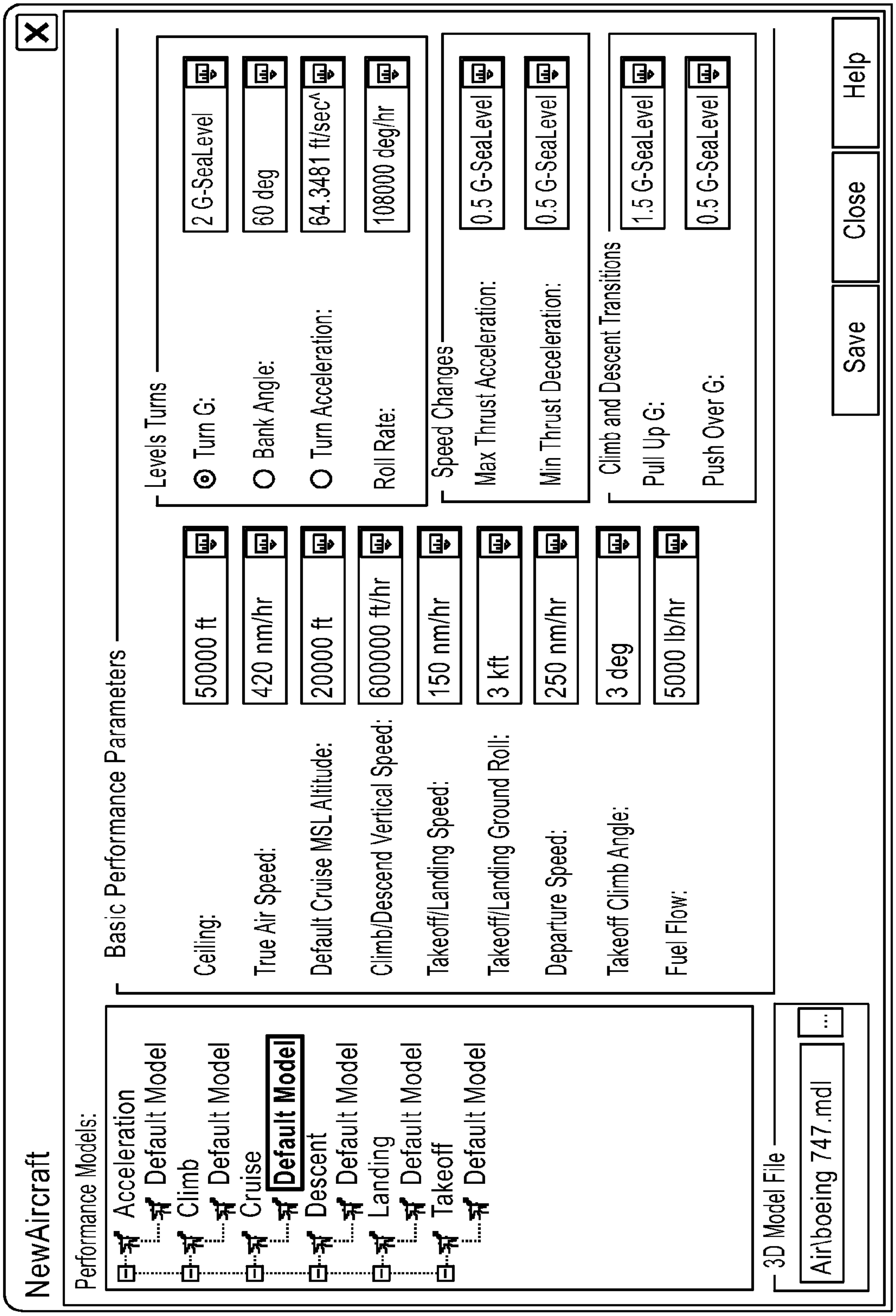
FIG. 22 illustrates a new aircraft window.

The initial step is to add a new aircraft object to the scenario, rename it "Catalog747", and select the Mission Modeler in the aircraft's properties browser. On the Route page, the user clicks the Select Aircraft button. The user then clicks on Basic Airliner and clicks the New button to create a new aircraft, as illustrated in FIG. 21. Clicking the properties button on the toolbar opens the aircraft's properties window. The user then clicks on "Built-In Model" under the Cruise performance model and changes the Default Cruise Altitude (MSL) to 20,000, as illustrated in FIG. 22. The user clicks the ellipsis button next to the 3D Model File field to selects a 3D model for the aircraft. In the Air folder, the user selects the boeing 747. mdl file, and then clicks Open. The user clicks Save in the properties window and then clicks Close to return to the Select Aircraft window. The user then double-clicks on the new aircraft, types a new name for the aircraft, "Catalog 747", and then hits Enter. The user selects OK to close the Select Aircraft window. The new aircraft is now saved in the catalog and has been selected as the aircraft type for this Mission Modeler aircraft object.

To continue with setting up the mission, the user clicks the Insert Procedure After Phase button on the Mission toolbar. The user selects Waypoint as the type, enters Marshal Point in the name field, and enters 37.5 deg and 128 deg in the Latitude and Longitude fields, respectively. Clicking Add to Catalog adds the waypoint to the AGI Waypoints catalog. The user clicks "Next" and then accepts the default Arc procedure that is defined for the user and clicks Finish to add the procedure.

Figure 23:
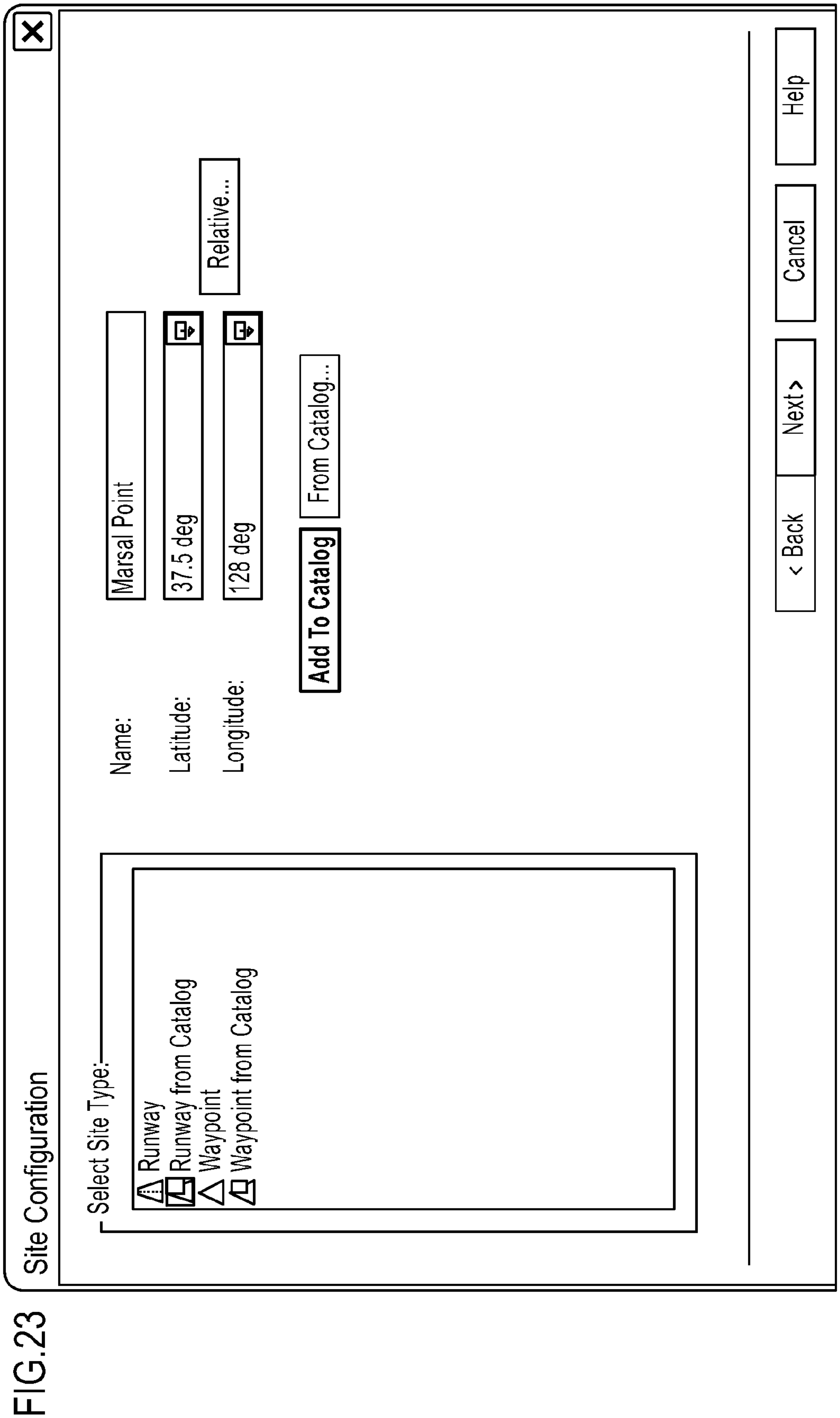
FIG. 23 illustrates a site configuration window.

To insert a new procedure, this time the user selects Waypoint from Catalog as the type. On the left side of the catalog display, the user will notice that they are in the Waypoints catalog of the User Waypoints source, as illustrated in FIG. 23. On the right side, the user can see that the Marshal Point waypoint that was just created is now stored in the Waypoint catalog and available for use with procedures for any aircraft. The user can click Cancel to return to the Mission page (the user does not need to add another procedure here), click OK on the Mission page to close it, and then select the 3D Graphics window.

Figure 24:
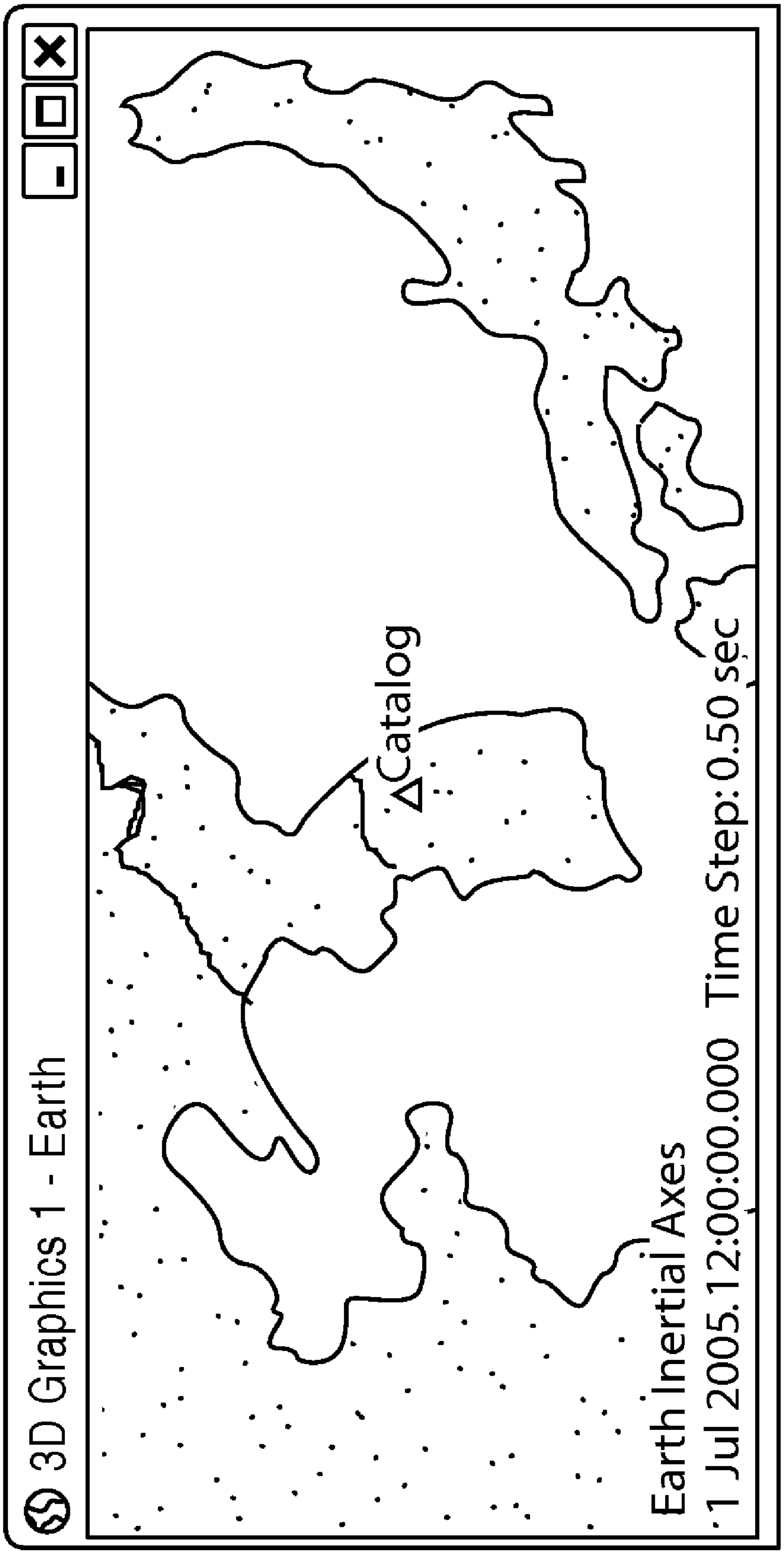
FIG. 24 illustrates a map window.

As before, the user clicks the View From/To button on the 3D Graphics toolbar and set the view from and to the Earth. The user can then click the Reset button on the Animation toolbar, and then manipulate the 3D Graphics window so that the Korean peninsula is in view. The user will see the aircraft they created for this exercise, waiting at the waypoint they created, as illustrated in FIG. 24.

Terrain Following

The Aircraft Mission Modeler features a Terrain Following procedure that allows a user to model an aircraft flying realistically over terrain data. The algorithm prevents an aircraft from accidentally intersecting (a.k.a. slamming into) a sudden change in terrain, such as a cliff. To avoid this problems a user adds appropriate terrain data to the scenario, which, in an embodiment using STK 7, can be found in the folder <install directory>\Help\STK\samples and is named hoquiam-e.dem.

For this example, the user adds a new aircraft object, renames it "TerrainFollow", and selects the Mission Modeler in the aircraft's properties browser. The user then clicks the Select Aircraft button and, in the Select Aircraft window, makes a copy of Basic Fighter and renames the copy TutorialFighter.

Figure 25:
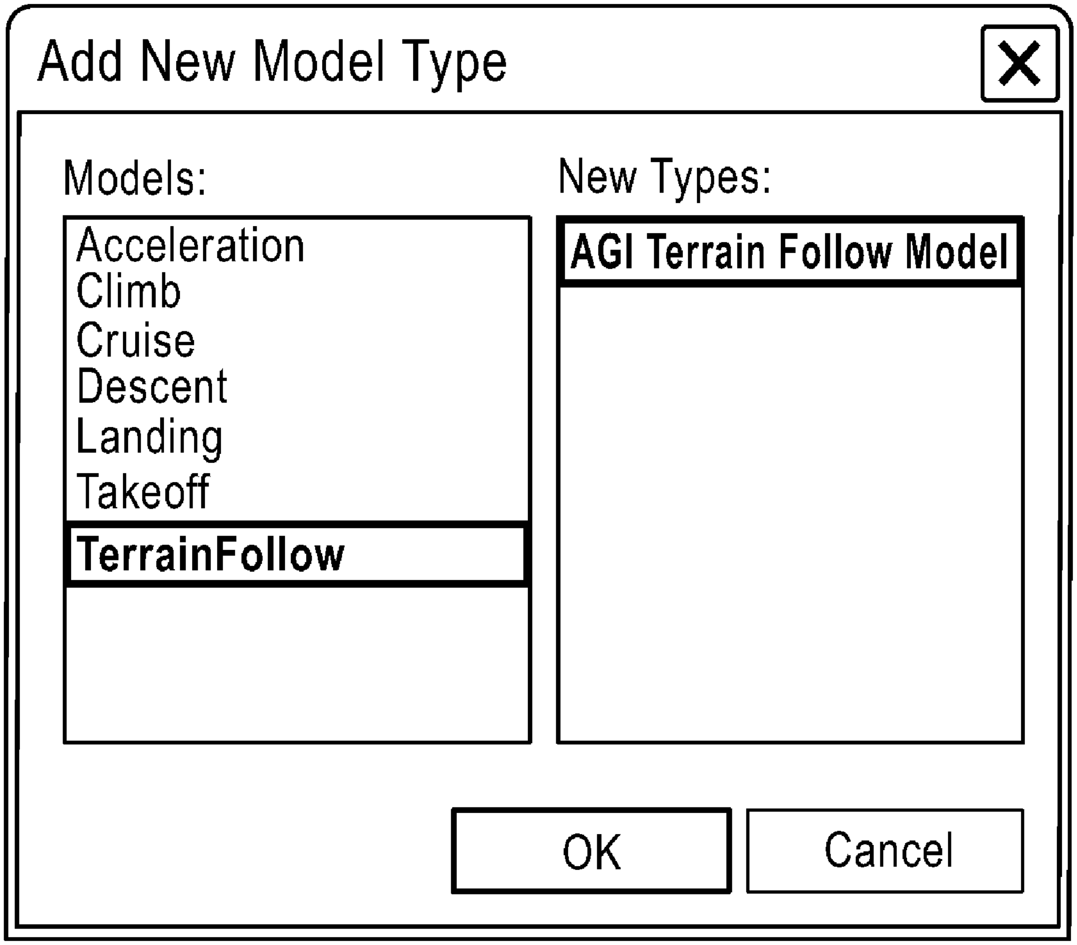
FIG. 25 illustrates an add new model type window.
Figure 26:
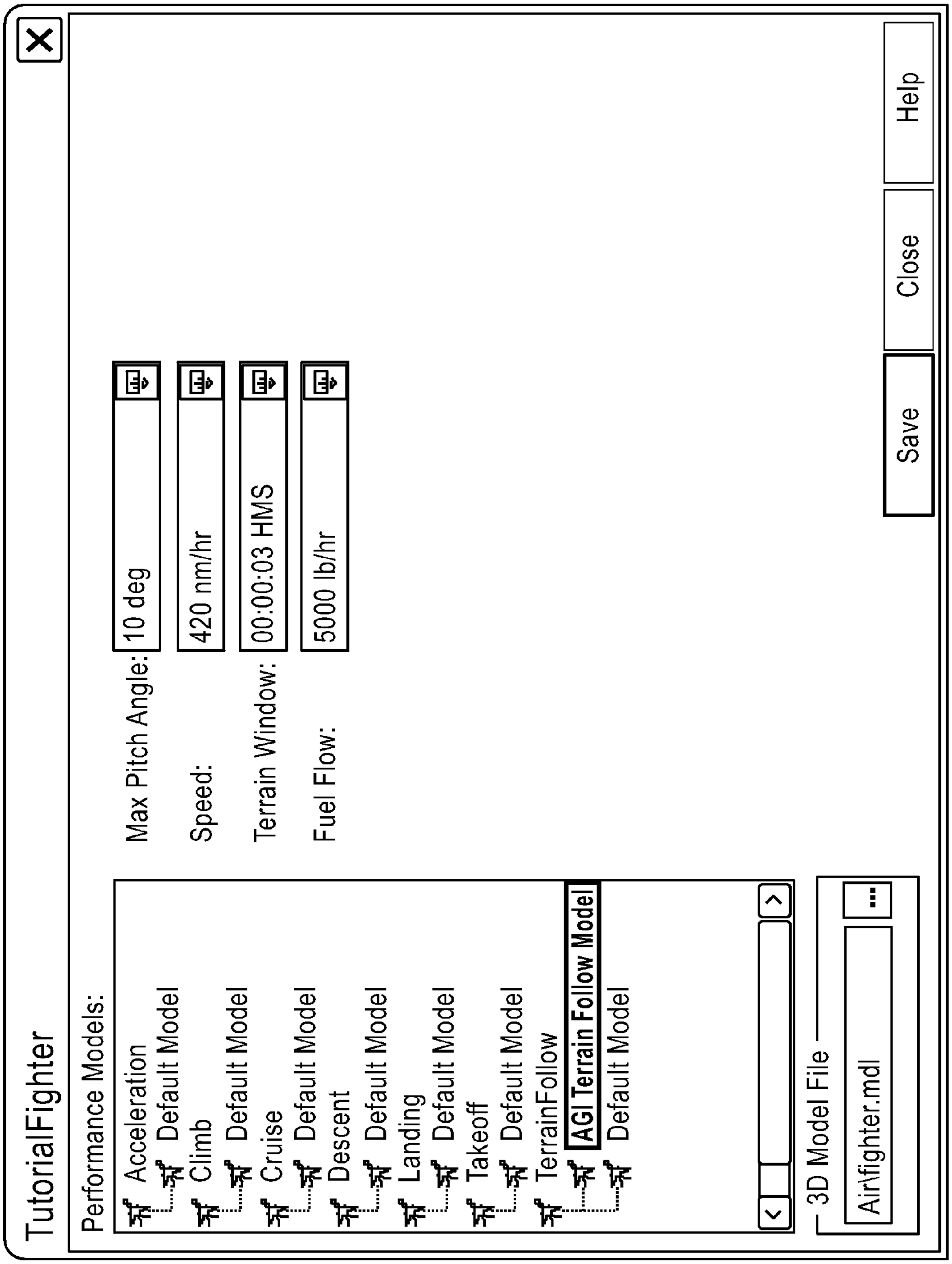
FIG. 26 illustrates a terrain following performance model window.

Next, the user clicks OK to return to the Mission page, clicks the Aircraft Catalog for Current Aircraft button to open the properties window, and, in the Performance Models area, right-clicks on any performance model and selects "Add New Model Type . . . ". In the Add New Model Type window illustrated in FIG. 25, the user selects TerrainFollow in the Models area, and then selects the AGI Terrain Follow Model in the New Types area. The user clicks OK to select the model, which will return the user to the Aircraft Catalog for Current Aircraft window. The parameters for the newly created Terrain Follow model will be displayed on the right, as illustrated in FIG. 26.

The user then clicks the ellipsis button next to the 3D Model File field, selects the f-35_jsf_cv.mdl file, and clicks Open. The user clicks Save and then Close to return to the Mission page. The user next clicks the Specify Phase Performance Models button on the Mission toolbar.

Figure 27:
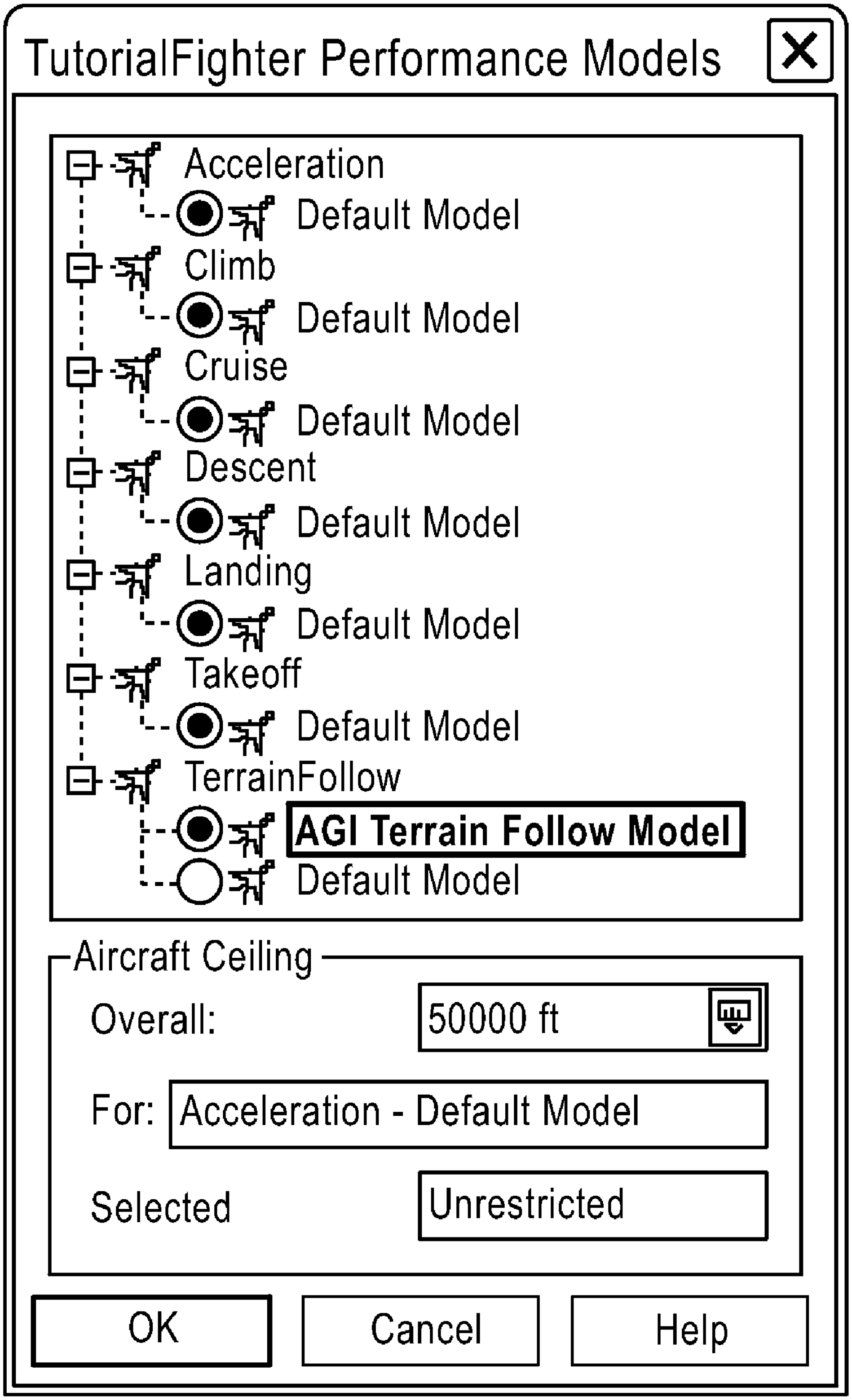
FIG. 27 illustrates a performance model window.

In the Performance Models window, illustrated in FIG. 27, the user clicks on Terrain Follow to expose the available models, selects the AGI Terrain Follow model to apply it to the phase, and then clicks OK to return to the Mission page. This will enable the user to assign the terrain following procedure to the aircraft.

Figure 28:
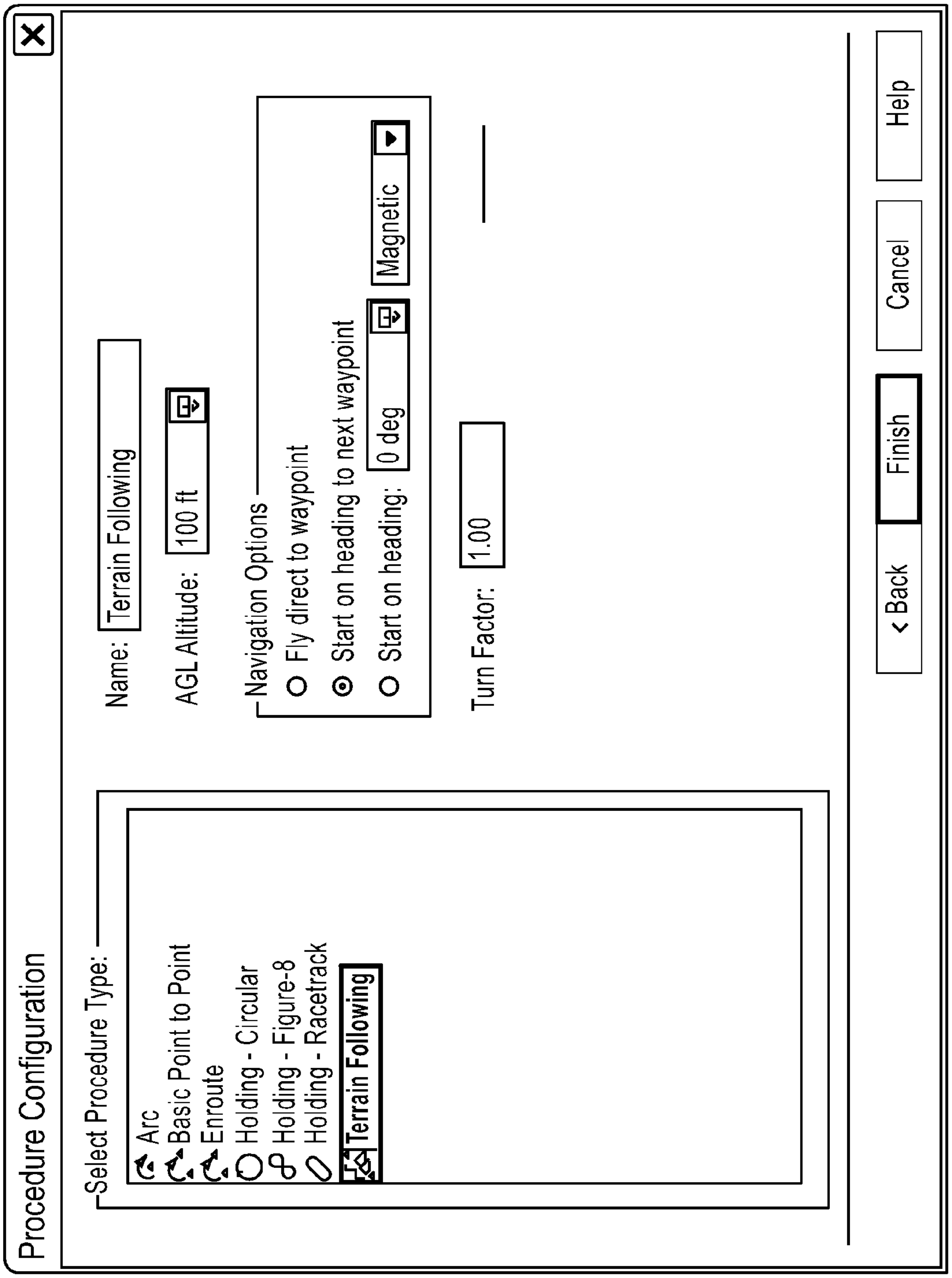
FIG. 28 illustrates a procedure configuration window.

On the Mission page, the user inserts a procedure, selecting Waypoint as the type and defining latitude and longitude as 46.227 deg and −122.187 deg, respectively. The user clicks "Next" and selects "Terrain Following" as the procedure type and sets the Altitude (AGL) field to 100, as illustrated in FIG. 28. This defines the minimum height above the terrain that the aircraft will fly during the procedure. For this exercise, the user inserts six more procedures of the same site and procedure type with the following latitudes and longitudes, in degrees:

46.179-122.190
46.203-122.213
46.218-122.193
46.209-122.168
46.189-122.174
46.043-122.219

Figure 29:
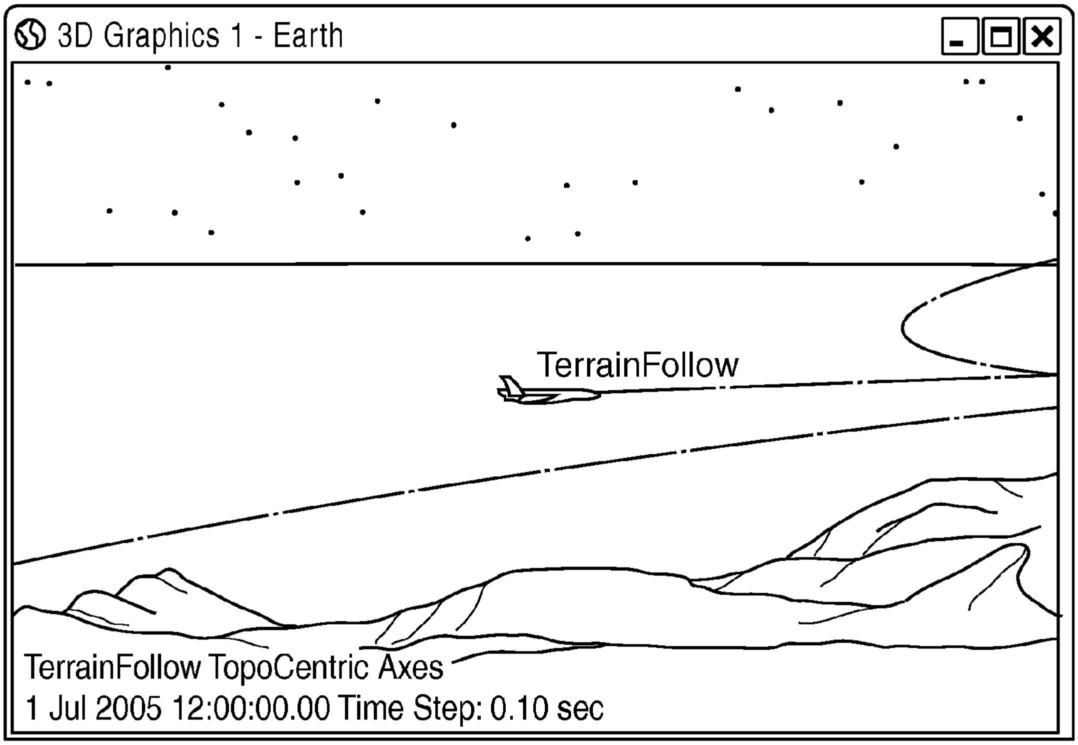
FIG. 29 illustrates an aircraft view window for terrain following.

The user then clicks "OK" to close the properties browser and selects the 3D Graphics window. Next, the user clicks "View From/To" on the 3D Graphics toolbar and sets the view from and to the TerrainFollow aircraft object. The user clicks the "Decrease Time Step" button on the Animation toolbar to reduce the animation time step to 0.10 seconds, which will be a much better speed at which to view this mission from up close. In the 3D Graphics window, the user adjusts the view so that the user is looking at the fighter from a side view, pointing towards the right side of the plane, as illustrated in FIG. 29.

Figure 30:
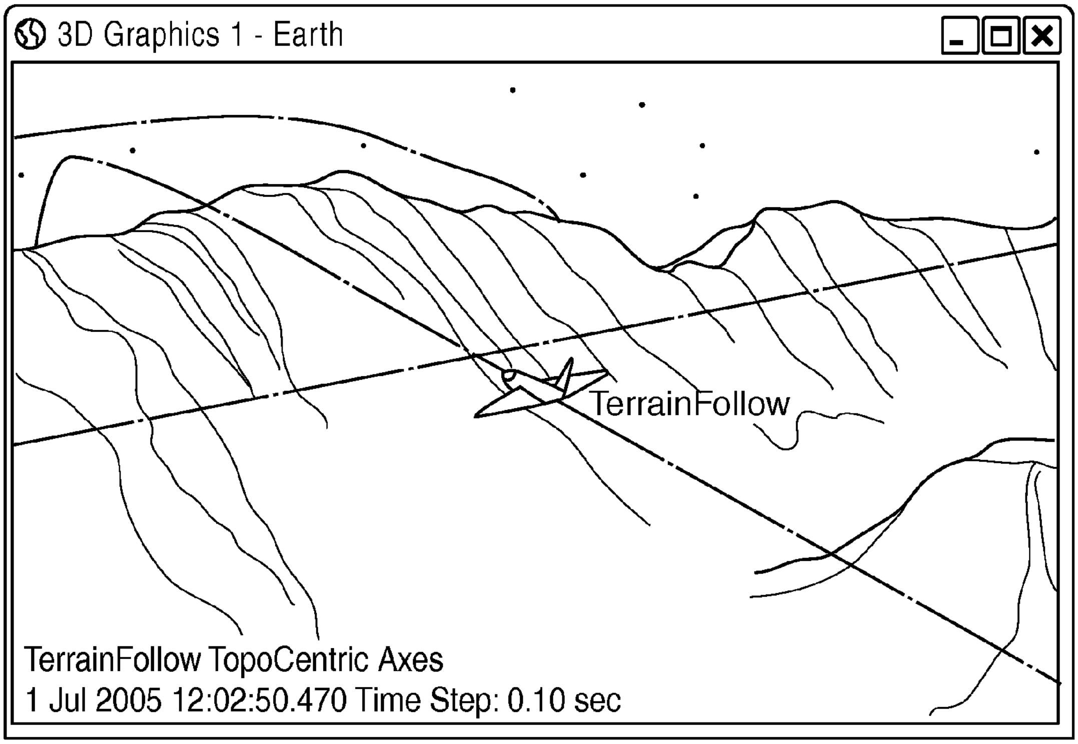
FIG. 30 illustrates a mission animation window.

The user can then animate the scenario, as illustrated in FIG. 30, and observe how that the terrain affects altitude of the flight path. To get a better view, the user can manipulate the camera angle throughout the animation, but the angle a user starts from is the best one to use if they just want to sit back and watch.

Using Phase Performance Models

Performance models define the behavior of the aircraft when performing various kinds of maneuvering. A user can select some or all of these performance models to use with each phase of the mission, which allows the user to vary the manner in which the aircraft performs based on the priorities of the mission. In this exercise, for example, a user will define performance models for maximum performance and maximum fuel conservation, and then employ these models to conserve fuel when flying through a 'safe zone' and holding for a possible air support mission, and then to burn fuel in favor of maximum performance when called in to deliver support and withdraw from a 'threat area'.

Setting Up

For this example, the user will continue to use the "MissionModeler" scenario. To set up for this exercise, the user just creates a new aircraft object and renames it "AirSupport".

Selecting an Aircraft

In a first step, the user opens the "AirSupport" aircraft's properties browser and select the Mission Modeler. On the Route page, the user clicks the Select Aircraft button and in the Select Aircraft window, selects TutorialFighter, and then clicks OK to close the window.

Defining Performance Models

To define Performance Models, the user clicks the Aircraft Catalog for Current Aircraft button to open the properties window. In the Performance Models area, the user right-clicks on Acceleration and selects Add New Model Type . . . from the drop-down menu. In the Add New Model Type window that opens, the user selects Acceleration in the Models area and AGI Acceleration Model in the New Types area, and then clicks OK to select the model, which will return the user to the Aircraft Catalog for Current Aircraft window. The parameters for the newly created Acceleration model will be displayed on the right, illustrated in FIG. 31.

Figure 31:
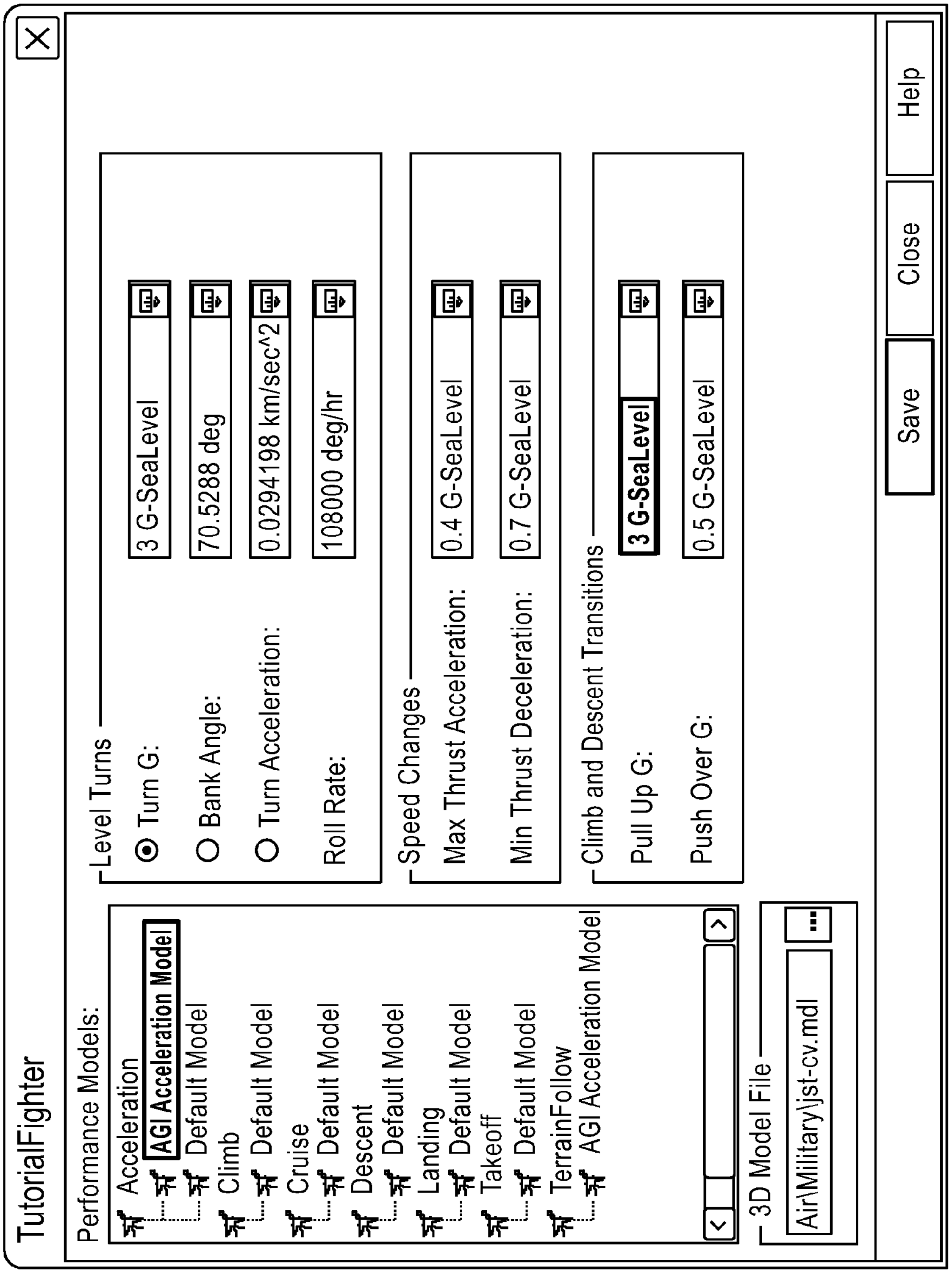
FIG. 31 illustrates a catalog aircraft window.

For the new acceleration model, the user sets the values shown in FIG. 31. The user right-clicks on the acceleration model just created and selects Rename from the dropdown menu and renames the model "MaxConserve". Repeating the basic process above, the user creates another Acceleration Performance model with the following values and renames it "MaxPerformance".

Turn G 5 G-SeaLevel
Max Thrust Acceleration 1.1 G-SeaLevel
Pull Up G 4 G-SeaLevel
Push Over G −2 G-SeaLevel The user can then create two new performance models each for Climb and Cruise, naming them MaxConserve and MaxPerformance, as done with the Acceleration models. These models are defined by a series of points, listed in a table. Setting the values as follows, editing the 2nd row of the table for the Climb models, and both rows of the table for the Cruise models.

Climb—Max Conserve
Downrange (nm) 25
Elapsed Time (hh:mm:ss) 00:05:00
Fuel (lb) 3000
Climb—Max Performance
Downrange (nm) 15
Elapsed Time (hh:mm:ss) 00:01:00
Fuel (lb) 9000
Cruise—Max Conserve
True Air Speed (nm/hr) 300
Fuel Flow (lb/hr) 4000

Cruise—Max Performance

True Air Speed (nm/hr) 550

Fuel Flow (lb/hr) 9000

After adding all the performance models, the user clicks Save and then Close to return to the Mission page.

Adding Phases and Procedures

Figure 32:
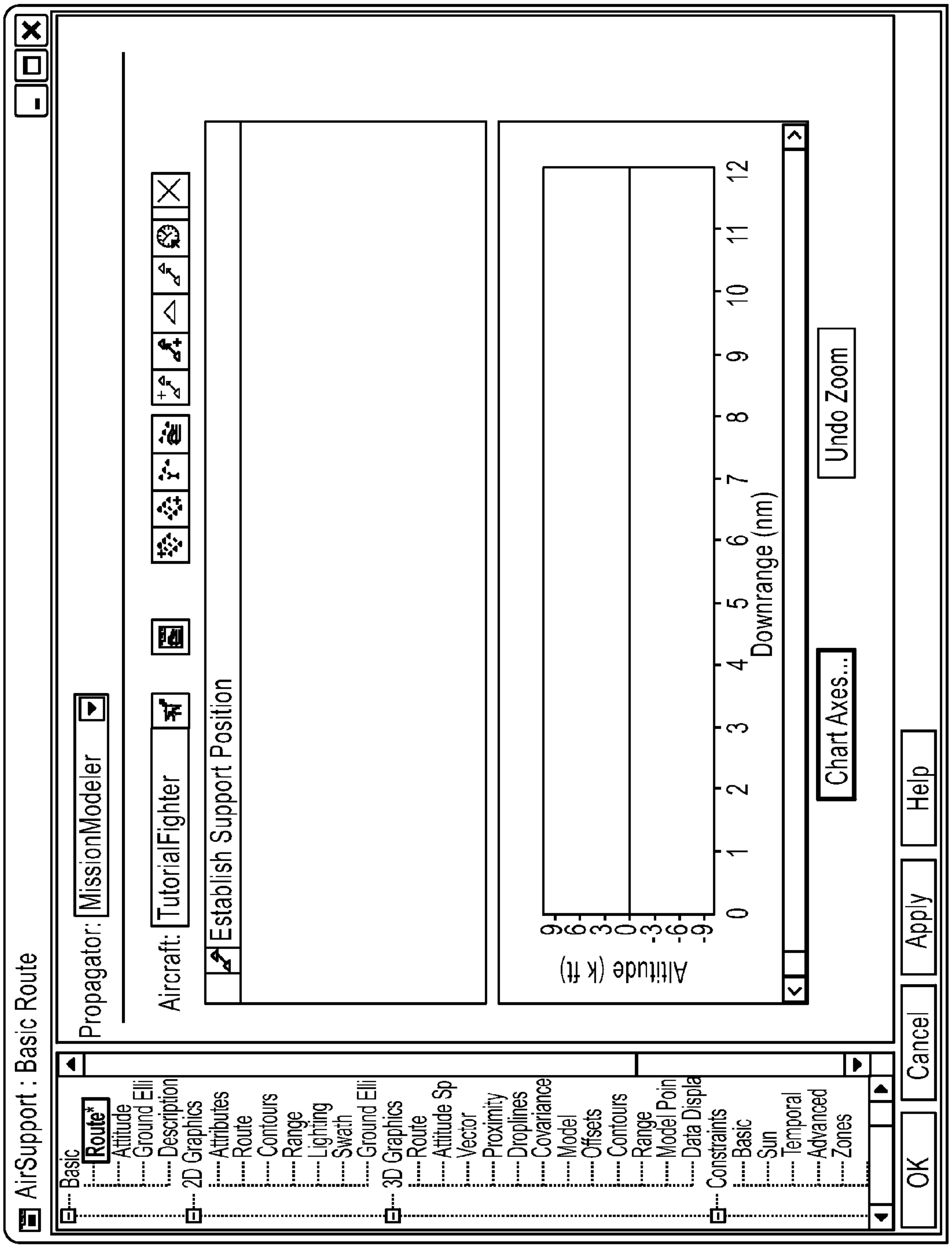
FIG. 32 illustrates a basic route window.
Figure 33:
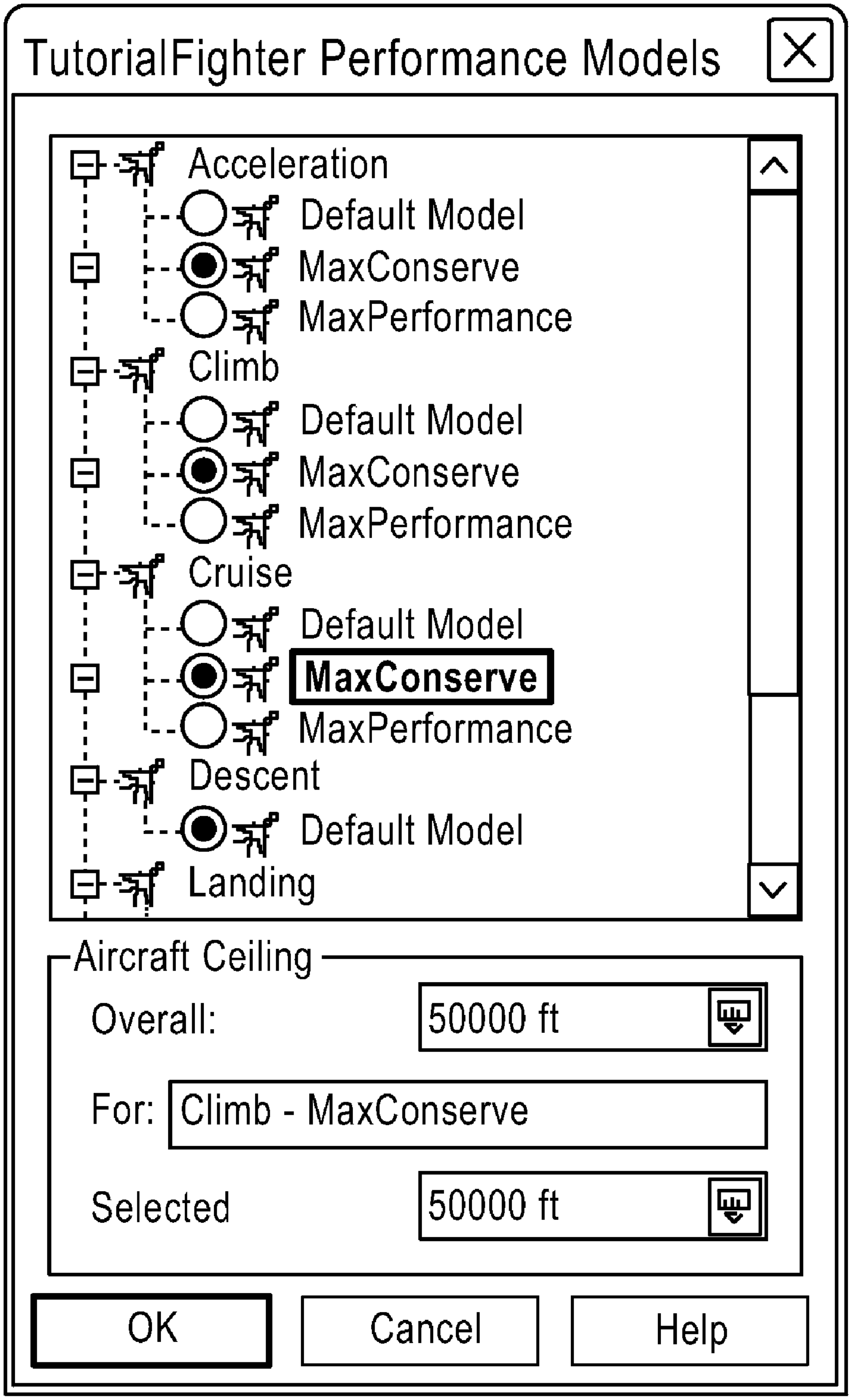
FIG. 33 illustrates a performance model window.

To add phases and procedures, the user right-clicks on Phase 1, selects Rename mission phase from the drop-down menu, and renames the phase "Establish Support Position" as illustrated in FIG. 32. The user then clicks the Phase Performance Models button to open the Performance Models window, as illustrated in FIG. 33.

The user then selects the MaxConserve models for Acceleration, Climb, and Cruise, and then clicks OK. To insert a new procedure, the user selects a Runway site with latitude, longitude, and altitude of 37.42, −116.75, and 100, respectively, and then selects a Takeoff procedure with the default settings. To insert another procedure, the user selects a Waypoint site with latitude and longitude of 38.87 and −115.87 and selects an Enroute procedure with the default settings. To insert another procedure, the user selects a Waypoint site with latitude and longitude of 38.95 and −116.02 and selects a Circular Holding procedure with a diameter of 10 nm.

The user clicks on the Establish Support Position phase and then clicks the Insert Phase After Phase button to insert a new phase, naming it Air Support Action, and then clicks OK. The Performance Models window will open automatically and the user then selects the MaxPerformance models for Acceleration, Climb, and Cruise, and clicks OK.

To insert a procedure after the Air Support Action phase, the user selects a Waypoint site with latitude and longitude of 39.28 and −116.15, respectively and selects a Basic Point to Point procedure with the default settings. The user then inserts another procedure, selecting a Waypoint site with latitude and longitude of 39.12 and −115.87, respectively, and then selects a Basic Point-to-Point procedure with the default settings. To insert a new phase, the user names it Return to Base, and then clicks OK.

Figure 34:
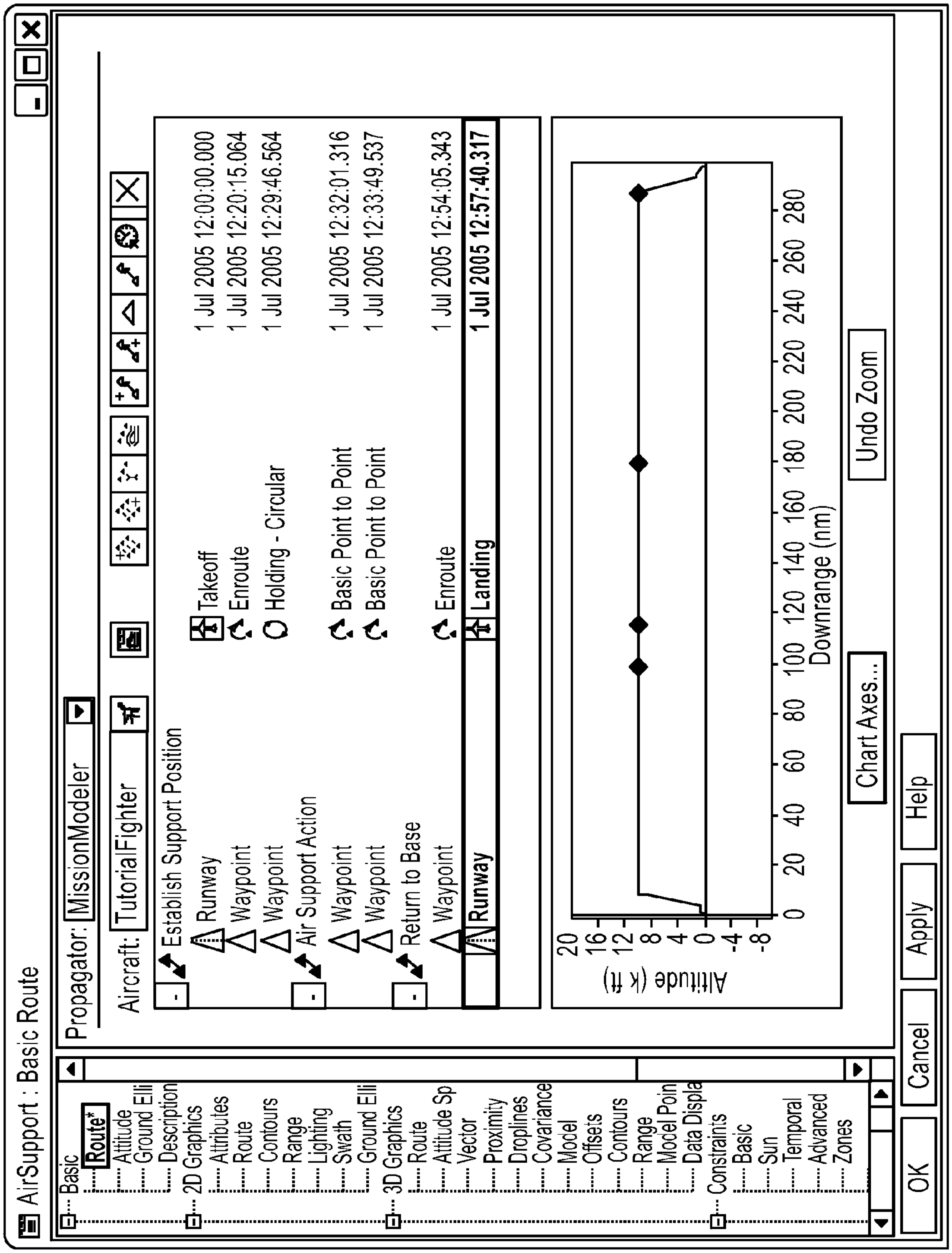
FIG. 34 illustrates a window for a basic route of an AirSupport mission.

At this point, the Performance Models window will automatically open. The user selects the MaxConserve models for Acceleration, Climb, and Cruise, and then clicks OK. To insert a procedure after the Return to Base phase, the user selects a Waypoint site with latitude and longitude of 37.54 and −116.67, respectively and selects an Enroute procedure with the default settings. The user inserts another procedure by selecting a Runway site with latitude, longitude, and altitude of 37.42, −116.75, and 100, respectively and selecting a Landing procedure with the default settings, as illustrated in FIG. 34.

Figure 35:
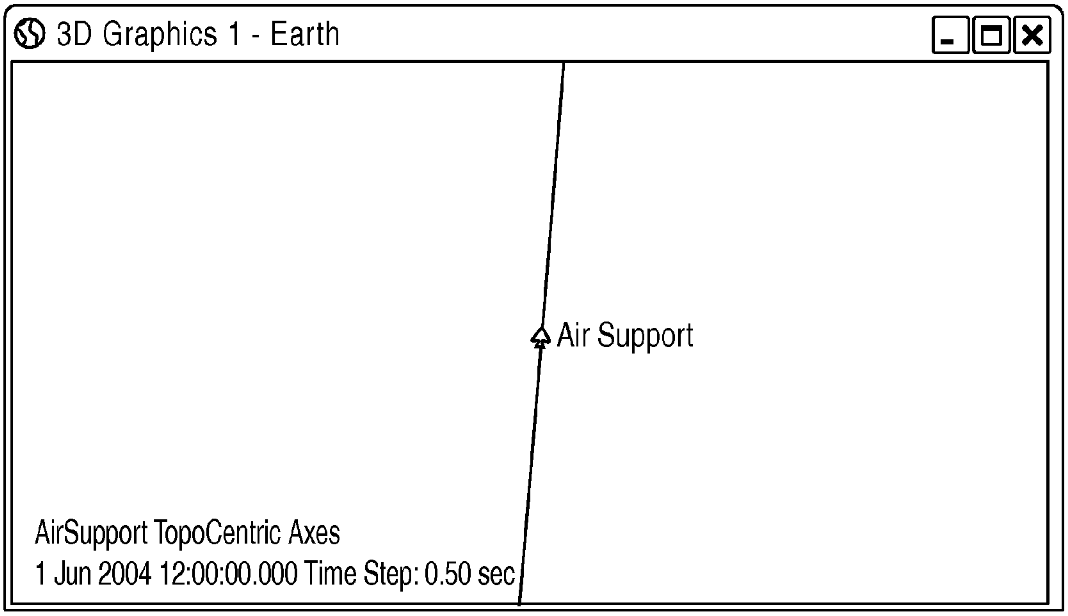
FIG. 35 illustrates a zoomed out view of the AirSupport mission.
Figure 36:
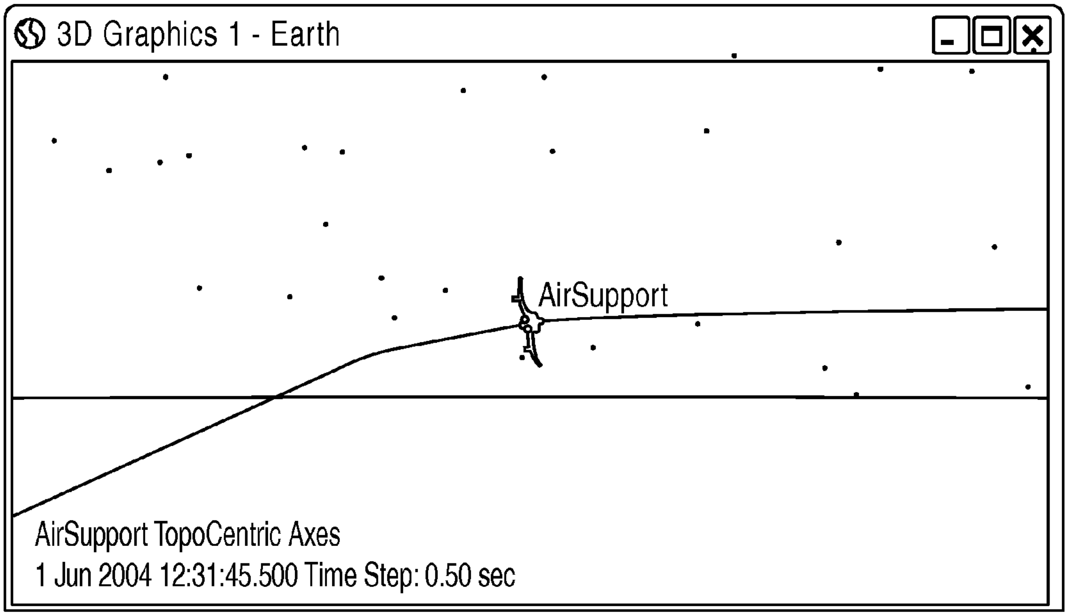
FIG. 36 illustrates an animation of the AirSupport mission.

The user clicks OK to close the properties browser and then selects the 3D Graphics window. The user clicks the View From/To button in the 3D Graphics toolbar and sets the view from and to the AirSupport aircraft. The user clicks the Reset button in the Animation toolbar and then in the 3D Graphics window, zooms out from above the aircraft so that the model appears very small, as illustrated in FIG. 35. The user then clicks the Play button, and observes the difference in the aircraft's flight as it reaches the Air Support Action phase and then transitions to the Return to Base phase, as illustrated in FIG. 36. The aircraft moves noticeably faster through the Air Support Action phase, as the emphasis the user has placed on the performance models for that phase is on speed and performance.

Figure 37:
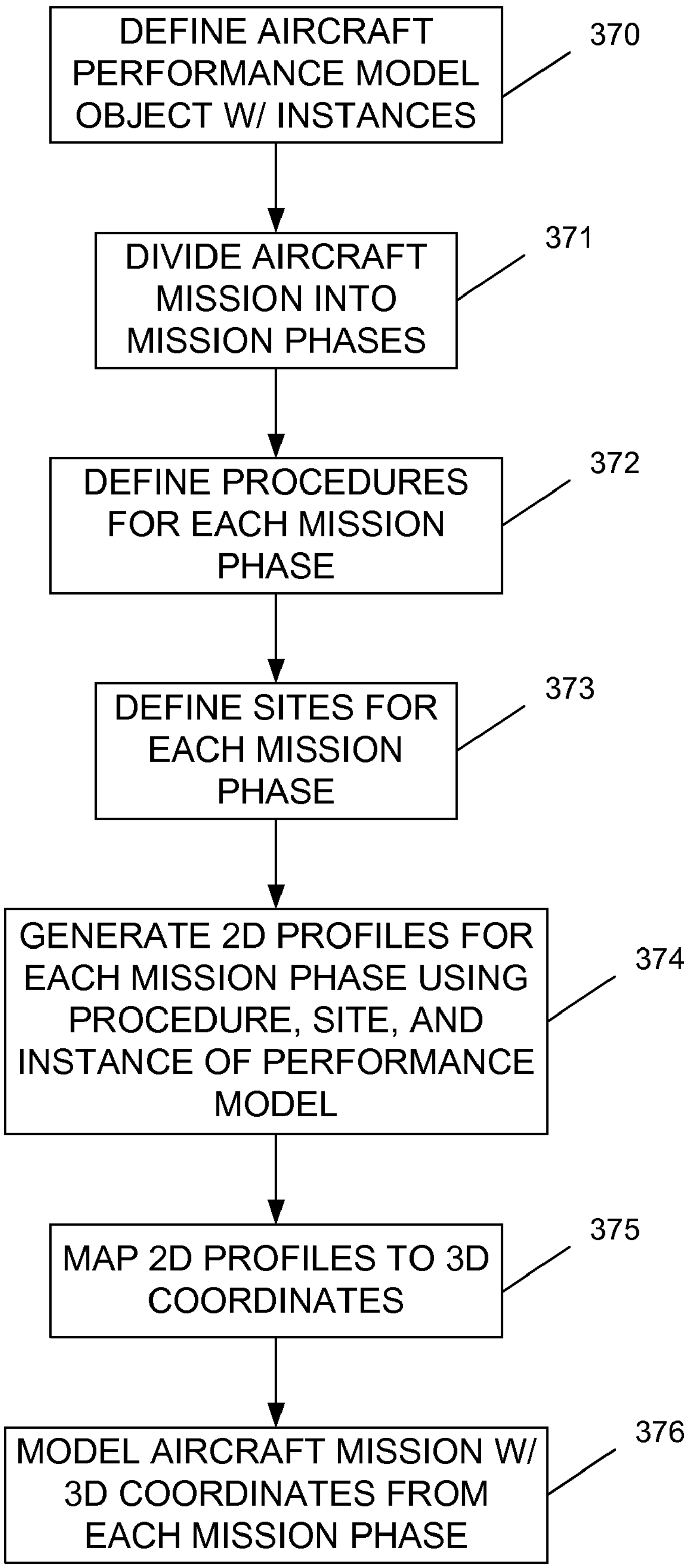
FIG. 37 illustrates a process flow chart for an embodiment.

FIG. 37 illustrates a flow chart for a basic process or method for aircraft mission modeling, comprising defining an aircraft performance model object for an aircraft mission 370, wherein the aircraft performance model object comprises a collection of different performance model types with one or more instance of each type. The process further comprises dividing the aircraft mission into a plurality of mission phases 371; defining one or more procedures for each mission phase 372; and defining one or more sites for each procedure 373, wherein sites comprise a location or reference point. For each mission phase, the process generates a two-dimensional downrange-altitude profile using an associated procedure, site, and instance of performance model type 374. Then, the process uses each profile and the associated procedure to map the profile into three-dimensional coordinates 375 and models the aircraft mission using the three-dimensional coordinates from each mission phase 376.

Variations of this process include, but is not limited to, those wherein the three-dimensional coordinates are mapped using a Flat-Earth Coordinate System and then converted to Earth-Centered Fixed (ECF) coordinates, such as by using an algorithm.

Figure 38:
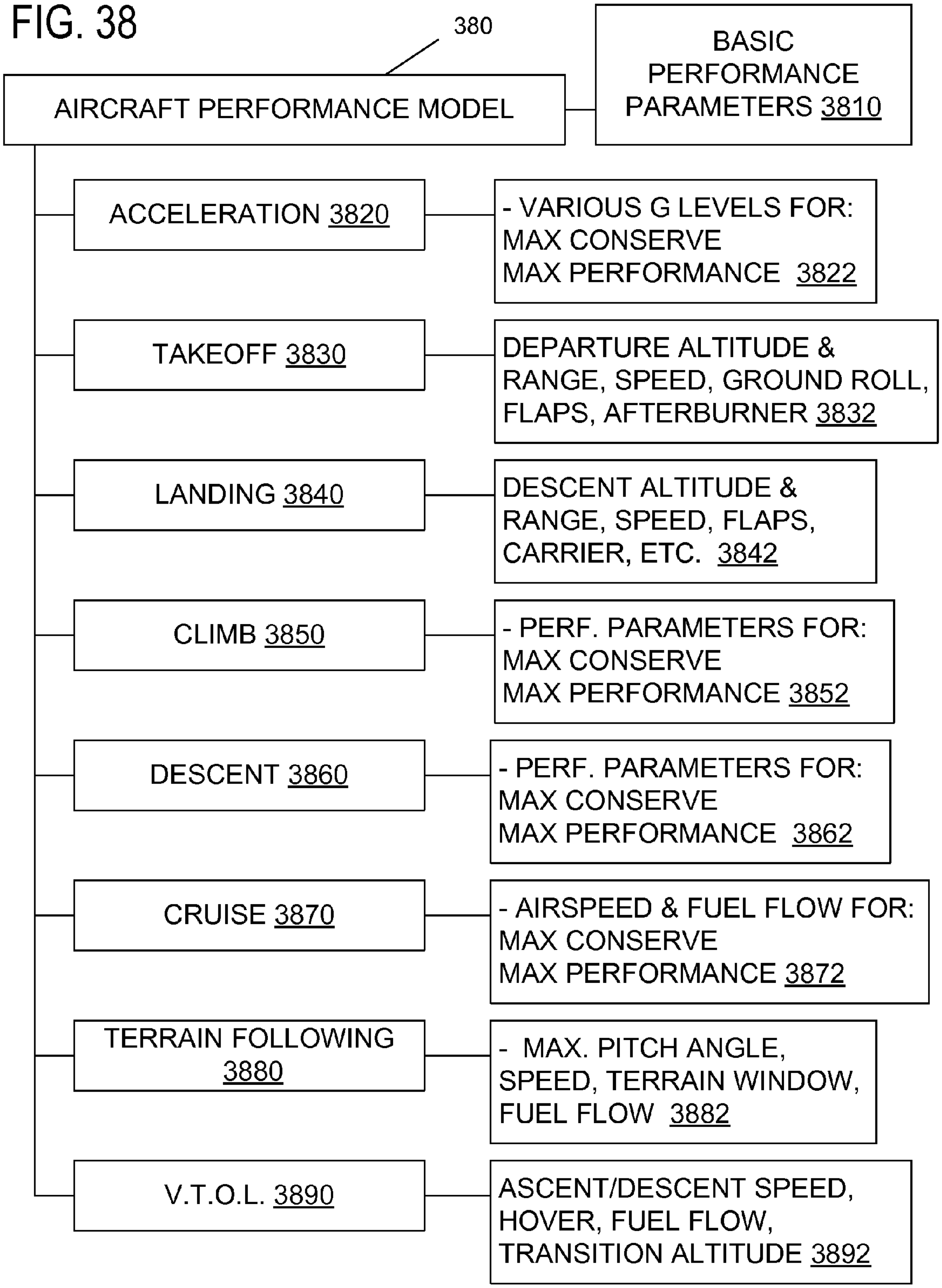
FIG. 38 illustrates an aircraft performance model structure.
Figure 39:
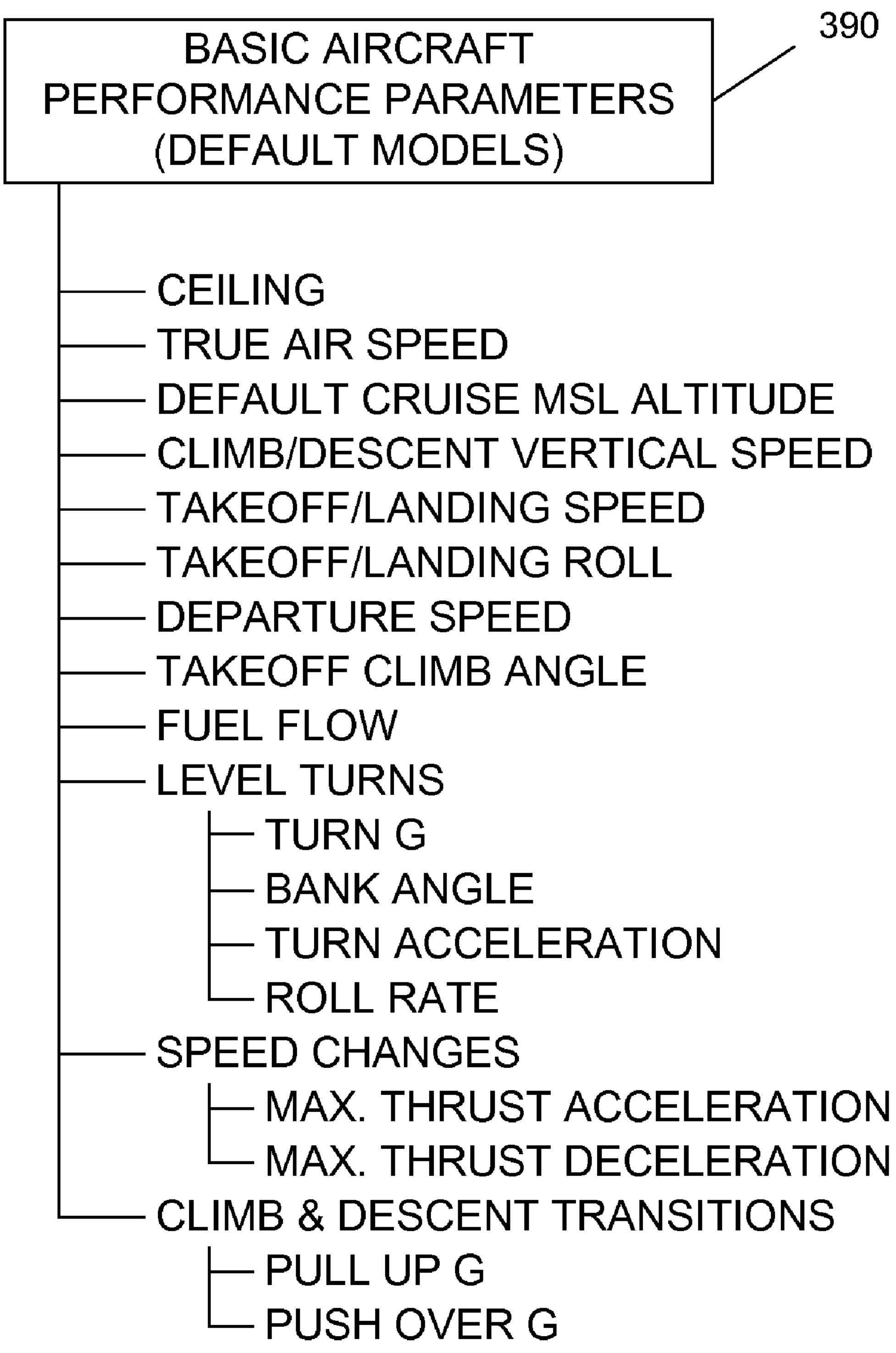
FIG. 39 illustrates basic aircraft performance parameters of a default model structure.

As illustrated in FIG. 38, aircraft performance model 380 types can use default parameters 3810 or be selected from various types, including but not limited to, acceleration 3820, takeoff 3830, landing 3840, climb 3850, descent 3860, cruise 3870, terrain following 3880 and VTOL 3890 types. Default models include basic aircraft performance models 390, which can include ceiling, true air speed, default cruise MSL altitude, climb/descent vertical speed, takeoff/landing speed, takeoff/landing roll, departure speed, takeoff climb angle, fuel flow, level turn parameters like turn G levels, bank angle, turn acceleration, and roll rate, speed change parameters like maximum thrust acceleration and deceleration, and climb and descent transition parameters like pull-up and push-over G levels, as illustrated in FIG. 39.

In the process, profiles are preferably formed from segments of curve shapes selected from the group consisting of linear, semi-circular Bezier and integrated curve shapes; sites are preferably selected from the group consisting of waypoints, runways, aircraft carriers, other aircraft in formation, and aerial tankers, although other methods are also possible.

Figure 40:
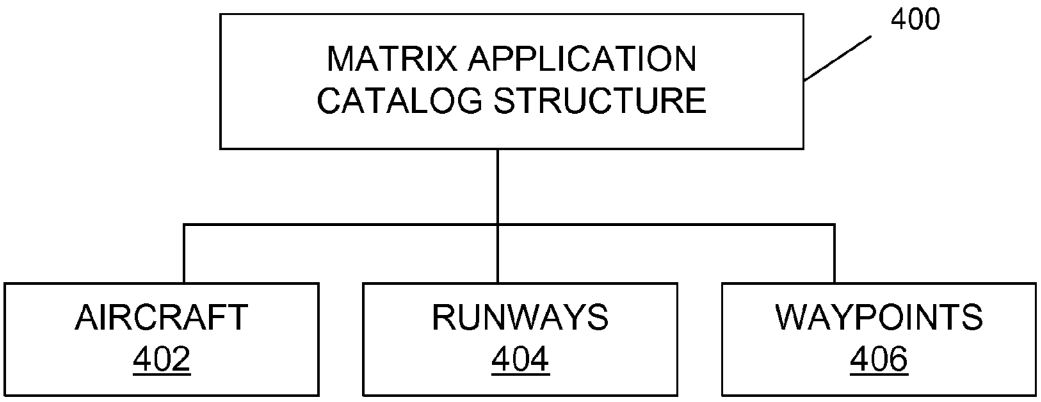
FIG. 40 illustrates an embodiment of a basic object catalog structure.

One embodiment comprises performing the method using a matrix application. In such an embodiment, the matrix application can optionally use a catalog structure 400 for the loading and saving of aircraft 402, runways 404, and waypoints 406, as illustrated in FIG. 40.

Figure 41:
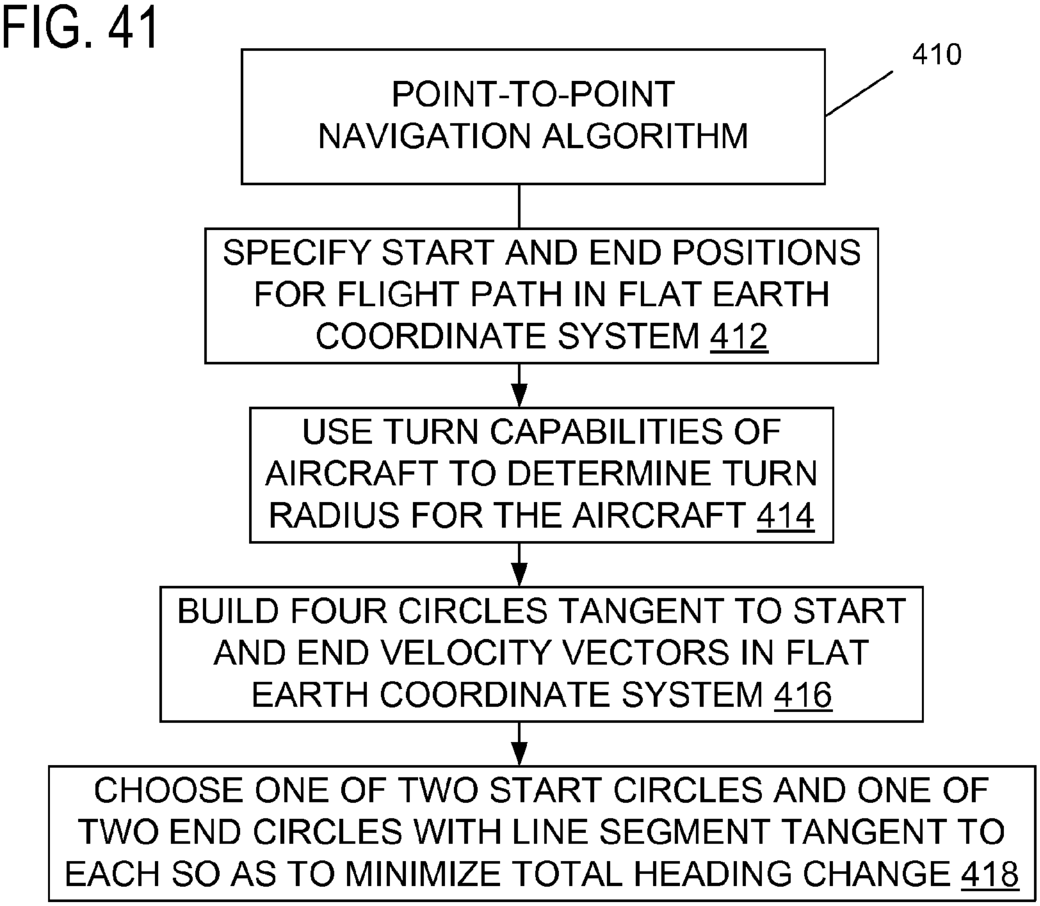
FIG. 41 illustrates an embodiment of a point-to-point navigation algorithm.

As illustrated in FIG. 41, an embodiment of the process is further contemplated which comprises use of a point-to-point navigation algorithm 410 that generates an optimum sequence of turns to fly an aircraft from one position and heading to another position and heading, while satisfying constraints on the aircraft's turn performance. The algorithm comprises: specifying start and end positions for the flight path segment in a Flat Earth Coordinate System 412; using turn capabilities of the aircraft to determine a turn radius for the aircraft 414; building four circles tangent to start and end velocity vectors in the flat earth system 416; and choosing one of two possible start circles and one of two possible end circles connected with a line segment tangent to each such that a total heading change for the combination of turns is minimized 418.

Figure 42:
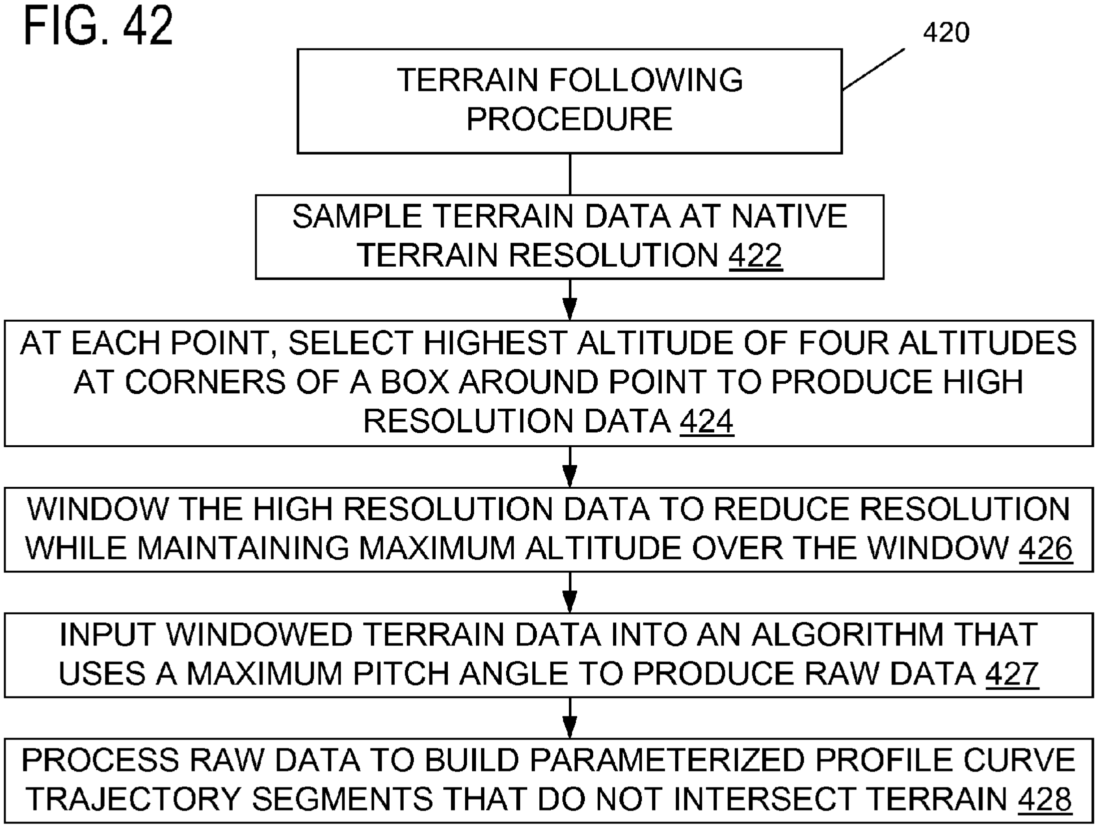
FIG. 42 illustrates an embodiment of a terrain following procedure.

As illustrated in FIG. 42, an embodiment of the process is further contemplated which comprises use of a terrain following procedure 420. The procedure comprises: sampling terrain data at native terrain resolution 422; at each point, selecting a highest altitude of four altitudes at corners of a box around the point to produce high resolution data 424; windowing the high resolution data to reduce its resolution while maintaining a maximum altitude over the window 426; inputting the windowed terrain data into an algorithm that uses a specified maximum pitch angle to further de-sample the terrain data to produce raw data 427; and processing the raw data to build parameterized profile curve trajectory segments that do not intersect the terrain 428.

Figure 43:
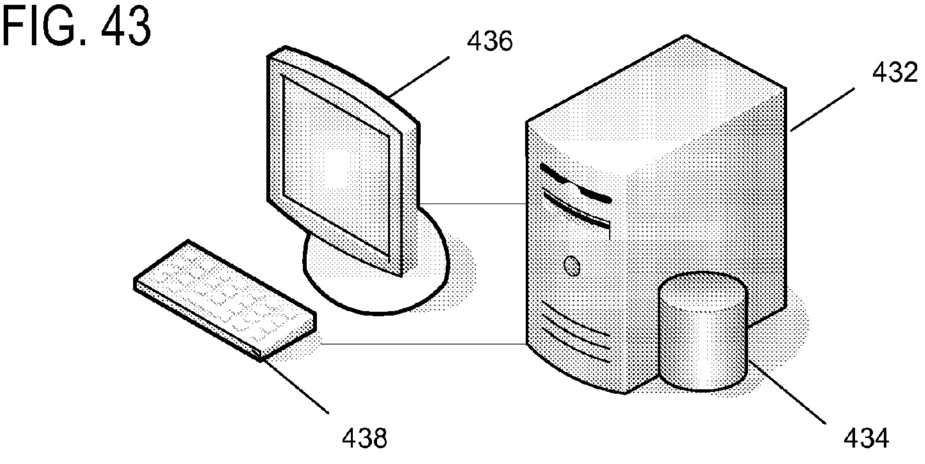
FIG. 43 illustrates an embodiment of a system for aircraft mission modeling.
Figure 44:
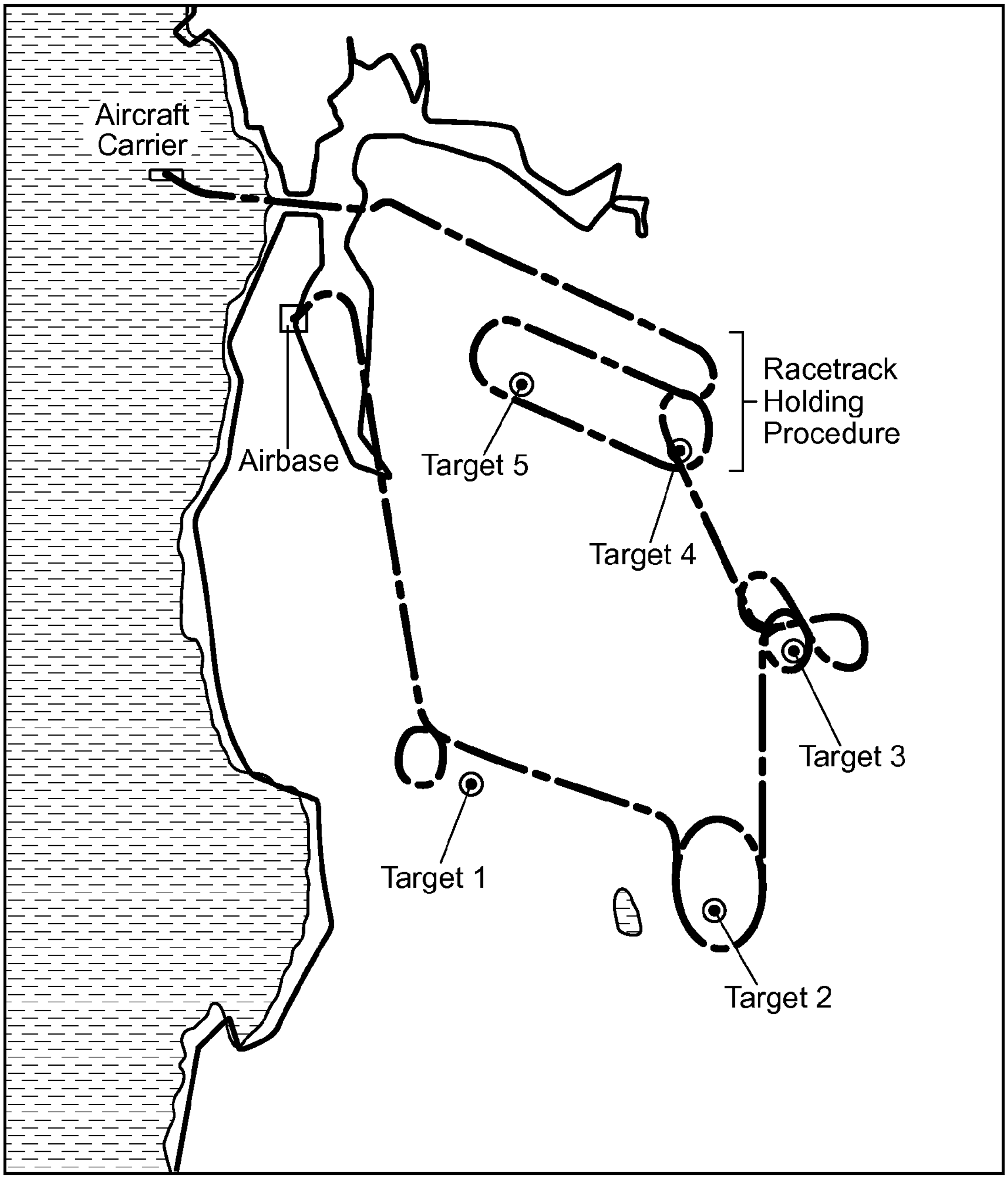
FIG. 44 illustrates an examplary graphic for a model of an aircraft mission.

An embodiment of a system for performing the process using software is illustrated in FIG. 43. Such a system typically uses a computer 432, such as a personal computer or workstation running the Microsoft® Windows XP Pro® or Vista® operating system, a database 434, which can be located on the computer 432 or connected over a network, a display 436, such as a CRT or LCD-based computer monitor, and a data input means 438, such as a keyboard and/or mouse. An example of a graphic display of an aircraft mission modeled using MissionModeler software in STK 7 is illustrated in FIG. 44. In the exemplary modeled mission, the aircraft takes off from a land-based runway, travels to stations at target 1, target 2, target 3, target 4, and target 5 before returning to land on a sea-based aircraft carrier. Circular, FIG. 8, and racetrack station and holding patterns are used and illustrated in the example.

While the example exercises disclosed herein are by no means exhaustive of the features of the Aircraft Mission Modeler, hopefully it has provided a user with a solid orientation to the concept and the user interface.

A system and method for providing aircraft mission modeling have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method for aircraft mission modeling and simulation performed by a computing device comprising:

selecting on the computing device an aircraft;

obtaining by the computing device performance data for the selected aircraft;

selecting on the computing device a maneuver to be performed by the aircraft;

applying by the computing device a rule to the selected maneuver to determine whether the selected aircraft is capable of performing the selected maneuver;

generating by the computing device a profile segment for the selected maneuver from the performance data when the selected aircraft is capable of performing the selected maneuver;

storing by the computing device the profile segment in a library of profile segments, wherein the library of profile segments comprises valid profile segments for the aircraft as determined by the rules;

selecting on the computing device a procedure for the aircraft to be performed, wherein the procedure executes one or more profile segments selected from the library of profile segments;

creating by the computing device an object for the procedure by assembling the one or more profile segments; and displaying by the computing device a simulation of the aircraft performing the procedure on a display device.

2. The method of claim 1 further comprising:

generating by the computing device a two-dimensional downrange-altitude profile, wherein the two-dimensional downrange-altitude profile is formed from segments of curve shapes comprising linear, semi-circular, Bezier and integrated curve shapes; and mapping by the computing device the two-dimensional downrange-altitude profile into three-dimensional coordinates.

3. The method of claim 2, wherein the three-dimensional coordinates are mapped by the computing device using a Flat-Earth Coordinate System and then converted to Earth-Centered Fixed (ECF) coordinates using an algorithm.

4. The method of claim 1, wherein the procedure is selected from the group consisting of acceleration, takeoff, landing, climb, descent, cruise, terrain following, and vertical takeoff and landing.

5. The method of claim 1, wherein creating by the computing device an object for the procedure by assembling the one or more profile segments comprises creating by the computing device an object for the procedure by assembling the one or more profile segments relative to a reference point.

6. The method of claim 5, wherein the reference point is selected from the group consisting of waypoints, runways, aircraft carriers, other aircraft in formation, and aerial tankers.

7. The method of claim 1 further comprising the computing device performing the method using a matrix application.

8. The method of claim 7, wherein the matrix application uses a catalog structure for the loading and saving of aircraft, performance data, reference points, rules, and profile segments.

9. A system for aircraft mission modeling comprising:

a computing device;

a display;

software instructions, wherein the computing device is configured with the software instructions to cause the computing device to perform operations comprising:

selecting an aircraft;

obtaining performance data for the selected aircraft;

selecting a maneuver to be performed by the aircraft;

applying a rule to the selected maneuver to determine whether the selected aircraft is capable of performing the selected maneuver;

generating a profile segment for the selected maneuver from the performance data when the selected aircraft is capable of performing the selected maneuver;

storing the profile segment in a library of profile segments, wherein the library of profile segments comprises valid profile segments for the aircraft as determined by the rules;

selecting a procedure for the aircraft to be performed, wherein the procedure executes one or more profile segments selected from the library of profile segments;

creating an object for the procedure by assembling the one or more profile segments; and displaying a simulation of the aircraft performing the procedure on the display.

10. The system of claim 9 wherein the computing device is further configured with software instructions to cause the computing device to perform operations comprising:

generating a two-dimensional downrange-altitude profile, wherein the two-dimensional downrange-altitude profile is formed from segments of curve shapes comprising linear, semi-circular, Bezier and integrated curve shapes; and mapping the two-dimensional downrange-altitude profile into three-dimensional coordinates.

11. The method of claim 10, wherein the three-dimensional coordinates are mapped by the computing device using a Flat-Earth Coordinate System and then converted to Earth-Centered Fixed (ECF) coordinates using an algorithm.

12. The system of claim 9, wherein the procedure is selected from the group consisting of acceleration, takeoff, landing, climb, descent, cruise, terrain following, and vertical take off and landing.

13. The system of claim 9, wherein creating an object for the procedure by assembling the one or more profile segments comprises creating an object for the procedure by assembling the one or more profile segments relative to a reference point.

14. The system of claim 13, wherein the reference point is selected from the group consisting of waypoints, runways, aircraft carriers, other aircraft in formation, and aerial tankers.

15. The system of claim 9 wherein the computing device is further configured with software instructions to cause the computing device to perform operations using a matrix application.

16. The method of claim 15, wherein the matrix application uses a catalog structure for the loading and saving of aircraft, performance data, reference points, rules, and profile segments.

* * * * *